(12) United States Patent
Goya et al.

(10) Patent No.: US 11,548,097 B2
(45) Date of Patent: Jan. 10, 2023

(54) MACHINING DEVICE, MACHINING UNIT, AND MACHINING METHOD

(71) Applicant: MITSUBISHI HEAVY INDUSTRIES, LTD., Tokyo (JP)

(72) Inventors: Saneyuki Goya, Tokyo (JP); Masato Kinouchi, Tokyo (JP); Toshiya Watanabe, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 1110 days.

(21) Appl. No.: 14/381,507

(22) PCT Filed: Feb. 28, 2013

(86) PCT No.: PCT/JP2013/055469
§ 371 (c)(1),
(2) Date: Aug. 27, 2014

(87) PCT Pub. No.: WO2013/133128
PCT Pub. Date: Sep. 12, 2013

(65) Prior Publication Data
US 2015/0014889 A1     Jan. 15, 2015

(30) Foreign Application Priority Data
Mar. 7, 2012  (JP) .............................. JP2012-051023

(51) Int. Cl.
*B23K 26/38*   (2014.01)
*B23K 26/08*   (2014.01)
(Continued)

(52) U.S. Cl.
CPC .......... *B23K 26/38* (2013.01); *B23K 26/0652* (2013.01); *B23K 26/0869* (2013.01); *B29C 59/16* (2013.01); *C04B 41/0036* (2013.01)

(58) Field of Classification Search
CPC ............................ B23K 26/106; B23K 26/388
See application file for complete search history.

(56) References Cited

U.S. PATENT DOCUMENTS

| | | | | |
|---|---|---|---|---|
| 3,487,331 A | * | 12/1969 | Gates | H01S 3/123 372/16 |
| 4,079,230 A | * | 3/1978 | Miyauchi | B23K 26/08 219/121.75 |

(Continued)

FOREIGN PATENT DOCUMENTS

| | | |
|---|---|---|
| CN | 1505553 A | 6/2004 |
| CN | 101935156 A | 1/2011 |

(Continued)

OTHER PUBLICATIONS

Chien, Wen-Tung, and Shiann-Chin Hou. "Investigating the recast layer formed during the laser trepan drilling of Inconel 718 using the Taguchi method." The International Journal of Advanced Manufacturing Technology 33.3 (2007): 308-316.*

(Continued)

*Primary Examiner* — Nicholas R Krasnow
(74) *Attorney, Agent, or Firm* — Birch, Stewart, Kolasch & Birch, LLP

(57) ABSTRACT

Provided are a machining device (10), a machining unit, and a machining method that irradiate a workpiece (8) with a laser beam to perform cutting or boring machining of the workpiece (8). The invention has a laser output device (12), a guiding optical system (14) that guides a laser beam, and an irradiating head (16) that guides a laser beam and irradiates the workpiece (8) with the laser beam. The irradiating head (16) integrally rotates a first prism (52) and a second prism (54) with a rotation mechanism, thereby rotating a light path of the laser beam around a rotational axis of the rotation mechanism and irradiating the workpiece (8) while rotating the position of irradiation to the work- (Continued)

piece. A control device (22) calculates an allowable rotational frequency range of the laser beam on the basis of the relationship between an allowable thickness of a remelted layer of the workpiece (8) and a rotational frequency, or the relationship between an allowable thickness of an oxidization layer of the workpiece and the rotational frequency, determines a rotational frequency included in the allowable rotational frequency range as the rotational frequency of the rotation mechanism, and rotates the rotation mechanism at the determined rotational frequency, thereby enabling high-precision machining to be performed with a simple configuration.

17 Claims, 12 Drawing Sheets

(51) Int. Cl.
  B23K 26/06 (2014.01)
  B29C 59/16 (2006.01)
  C04B 41/00 (2006.01)

(56) References Cited

U.S. PATENT DOCUMENTS

| | | | | |
|---|---|---|---|---|
| 4,822,974 | A * | 4/1989 | Leighton | B23K 26/0652 219/121.67 |
| 5,223,692 | A * | 6/1993 | Lozier | B23K 26/04 219/121.67 |
| 5,744,780 | A * | 4/1998 | Chang | B23K 26/032 219/121.73 |
| 6,444,948 | B1 * | 9/2002 | Giering | B23K 26/06 219/121.73 |
| 9,757,816 | B2 * | 9/2017 | Fujita | B23K 26/14 |
| 9,931,712 | B2 * | 4/2018 | Wang | B23K 26/0643 |
| 2001/0030739 | A1 * | 10/2001 | Hase | G03F 7/70716 355/53 |
| 2002/0005944 | A1 * | 1/2002 | Pratt | G06Q 10/08 356/152.1 |
| 2005/0236911 | A1 * | 10/2005 | Botos | B23Q 1/267 310/12.06 |
| 2009/0045176 | A1 * | 2/2009 | Wawers | G02B 27/40 219/121.67 |
| 2010/0326138 | A1 | 12/2010 | Kumantani et al. | |
| 2013/0175243 | A1 * | 7/2013 | Wang | B23K 26/0643 219/121.7 |

FOREIGN PATENT DOCUMENTS

| | | |
|---|---|---|
| EP | 0 460 338 A1 | 12/1991 |
| EP | 0 761 376 A1 | 3/1997 |
| JP | 6-155065 A | 6/1994 |
| JP | 2828871 B2 | 11/1998 |
| JP | 2831215 B2 | 12/1998 |
| JP | 2004-82167 A | 3/2004 |
| JP | 2004-136307 A | 5/2004 |
| JP | 2005-342749 A | 12/2005 |
| JP | 2009-50869 A | 3/2009 |
| JP | 2011-11212 A | 1/2011 |
| JP | 2011-25279 A | 2/2011 |
| JP | 2011025279 A * | 2/2011 |
| JP | 2011025279 A * | 2/2011 |
| JP | 2011-110598 A | 6/2011 |
| JP | 2012-17231 A | 1/2012 |
| WO | WO 02/087816 A2 | 11/2002 |

OTHER PUBLICATIONS

Chien, W.T. and Hou, S.C., 2007. Investigating the recast layer formed during the laser trepan drilling of Inconel 718 using the Taguchi method. The International Journal of Advanced Manufacturing Technology, 33(3-4), pp. 308-316. (Year: 2006).*

Leigh (NPL 2010) Leigh, S., Sezer, K., Li, L., Grafton-Reed, C. and Cuttell, M., 2010. Recast and oxide formation in laser-drilled acute holes in CMSX-4 nickel single-crystal superalloy. . . . (Year: 2010).*

Cleaver, Lecture notes, ECE 252 Introduction to Electrical Engineering, Lesson 19. Motors <URL=https://web.archive.org/web/20130822073635/http://raise.spd.louisville.edu/ECE252/L19.htm> (Year: 2013).*

Park—https://lopen.library.ubc.ca/media/download/pdf/831/1.0081000/1 Park, S., 2004. High frequency bandwidth cutting force measurements in milling using the spindle force sensor system, vol. Doctorate: University of British Columbia, Vancouver, Canada. (Year: 2003).*

Chinese Notification of the First Office Action for Chinese Application No. 201380011549.4, dated Apr. 20, 2015, along with an English translation thereof.

English translation of the Written Opinion of the International Searching Authority (Form PCT/ISA/237), dated May 21, 2013, for International Application No. PCT/JP2013/055469.

Chinese Notification for Patent Registration Formalities dated Apr. 29, 2016 in corresponding Chinese Application No. 201380011549.4 with English Translation.

Chinese Notification on the Grant of Patent Right for Invention dated Apr. 29, 2016 in corresponding Chinese Application No. 201380011549.4 with English Translation.

Taiwanese Notice of Allowance, dated May 26, 2016, for Taiwanese Application No. 102107946, along with a partial English translation.

Taiwanese Official Action dated Sep. 7, 2015 issued in corresponding Taiwanese Patent Application No. 102107946 with an English Translation.

* cited by examiner

<FRONT SURFACE>

<REAR SURFACE>

MACHINING DEVICE, MACHINING UNIT, AND MACHINING METHOD

TECHNICAL FIELD

The present invention relates to a machining device, a machining unit, and a machining method that irradiate a member to be machined with a laser beam to perform machining.

BACKGROUND ART

As machining devices that perform machining, such as cutting or boring of a workpiece, there are machining devices using a laser beam (refer to PTL 1 and PTL 2). The machining devices described in PTL 1 and PTL 2 irradiate the workpiece with a laser beam to perform cutting and boring of the workpiece. Additionally, PTL 1 describes a laser machining method that irradiates a workpiece with laser beams with at least two types of wavelengths to perform hole machining. The laser machining method includes a step of performing irradiation and machining along an inner periphery of a hole with a first laser beam having a spot diameter smaller than the diameter of the hole, and a step of irradiating a portion inside the periphery of the hole with a second laser beam having a spot diameter smaller than the diameter of the hole and a wavelength longer than the first laser beam, and machines the portion remaining having not been machined in the previous step by the next step. Additionally, PTL 1 describes a device that shifts the irradiation position of the first laser beam by combining a galvanometer mirror. PTL 2 describes a configuration in which a structure holding a lens is provided with a coil and a base is provided with a permanent magnet, and discloses driving the coil to causes a rotational motion of the lens to rotate a condensing point.

Additionally, PTL 3 whose applicant is the same as the present applicant describes a machining device that includes a $CO_2$ laser oscillator and an excimer laser oscillator and that uses a $CO_2$ laser beam and an excimer laser beam as two laser beams, radiating the laser beam of the $CO_2$ laser oscillator to thereby perform cutting or boring of a plastic member or an FRP member, and subsequently, radiating the laser beam of the excimer laser oscillator to a cut surface of the member and its vicinity to perform the laser beam cutting of removing a char layer or a thermal influence layer generated in the cut surface. A machining device described in PTL 3 describes that a laser beam whose cross-section is ring-shaped is used as the excimer laser beam, a $CO_2$ laser beam is inserted through a hollow portion of the laser beam to make the optical axes of both the laser beams the same, then both the laser beams are transmitted through the same transmission path, the laser beams are guided to the vicinity of a cutting or boring machining part of the plastic member or the FRP member, and both the laser beams are separated again in the vicinity of the machining part.

CITATION LIST

Patent Literature

[PTL 1] Japanese Unexamined Patent Application Publication No. 2011-110598
[PTL 2] Japanese Patent No. 2828871
[PTL 3] Japanese Patent No. 2831215

SUMMARY OF INVENTION

Technical Problem

A workpiece can be appropriately machined by rotating the irradiation position of a laser beam as in the machining devices described in PTL 1 and PTL 2. Additionally, a workpiece can be appropriately machined by using the two laser beams as in the machining device described in PTL 3. However, the machining devices described in PTLs 1 to 3 had problems in that the configuration of the devices becomes complicated or enlarged if machining precision is made high.

The invention has been made in view of the above, and an object thereof is to provide a machining device, a machining unit, and a machining method that can perform high-precision machining with a simpler configuration.

Solution to Problem

In order to solve the above-described problems and achieve the object, the invention provides a machining device that irradiates a workpiece with a laser beam to perform cutting or boring machining of the workpiece. The machining device includes a laser output device that outputs a laser beam; a guiding optical system that guides the laser beam output from the laser output device; and an irradiating head that guides the laser beam output from the guiding optical system, and irradiates the workpiece with the laser beam. The irradiating head includes a first prism that refracts the laser beam; a second prism that is arranged at a position facing the first prism to refract the laser beam; a rotation mechanism that integrally rotates the first prism and the second prism; and a control device that controls the operation of the rotation mechanism. The irradiating head integrally rotates the first prism and the second prism with the rotation mechanism, thereby rotating a light path of the laser beam around a rotational axis of the rotation mechanism and irradiating the workpiece while rotating the position of irradiation to the workpiece. The control device calculates an allowable rotational frequency range of the laser beam on the basis of the relationship between an allowable thickness of a remelted layer of the workpiece and a rotational frequency, or the relationship between an allowable thickness of an oxidization layer of the workpiece and the rotational frequency, determines a rotational frequency included in the allowable rotational frequency range as the rotational frequency of the rotation mechanism, and rotates the rotation mechanism at the determined rotational frequency.

Additionally, it is preferable that the laser output device output the laser beam in a pulse, and the control device set the cycle of ON/OFF of the laser beam to a nonintegral multiple of the cycle of rotation of the irradiation position.

Additionally, it is preferable that the allowable thickness of the remelted layer of the workpiece be a preset value or a value calculated on the basis of at least one of the material, thickness, and machining conditions of the workpiece.

Additionally, it is preferable that the workpiece be made of any material of Inconel (registered trademark), Hastelloy (registered trademark), stainless steel, ceramic, steel, carbon steel, ceramics, silicon, titanium, tungsten, resin, plastics, fiber-reinforced plastic, iron alloys other than a steel sheet, and an aluminum alloy.

Additionally, it is preferable that the laser output device be a fiber laser output device.

Additionally, it is preferable that the laser output device be a short pulse laser output device that outputs a laser beam in a pulse with a pulse width of 100 picoseconds or less.

Additionally, it is preferable that the irradiating head have a parallel optical system that collimates the laser beam output from the guiding optical system to cause the laser beam to enter the first prism, and a condensing optical system that condenses the laser beam output from the second prism.

Additionally, it is preferable that the rotation mechanism have a driving source of a rotating part rotating the first prism and the second prism arranged between the first prism and the parallel optical system.

Additionally, it is preferable that the rotation mechanism have a holding mechanism that holds the first prism and the second prism, and a motor that has a hollow rotary shaft in which the light path of the laser beam is a space, and rotates the holding mechanism.

Additionally, it is preferable that the rotation mechanism have a holding mechanism that holds the first prism and the second prism, a transmission mechanism that transmits a rotative force to the holding mechanism, and a driving source that rotates the transmission mechanism.

Additionally, it is preferable that the portion of the holding mechanism corresponding to the light path of the laser beam is a hollow spindle.

Additionally, it is preferable that the irradiating head have a supporting part that supports the holding mechanism, and a bearing that causes the holding mechanism to be supported by the supporting part in a rotatable state.

Additionally, it is preferable that the bearing include a hydrostatic bearing.

Additionally, it is preferable that the bearing include a rolling bearing.

Additionally, it is preferable that the rotational frequency of the rotation mechanism be 120 rpm or more.

Additionally, it is preferable that the irradiating head further include a cooling mechanism that cools the first prism and the second prism.

Additionally, it is preferable that the irradiating head further include a position adjusting mechanism that changes the relative position of the first prism and the second prism.

Additionally, it is preferable that the position adjusting mechanism change the relative angle of the first prism and the second prism.

Additionally, it is preferable that the position adjusting mechanism change the relative distance of the first prism and the second prism.

Additionally, it is preferable that the control device calculate an allowable rotational frequency range on the basis of the relationship between the amount of scattered matter of the workpiece and the rotational frequency of the laser beam, determine a rotational frequency included in the allowable rotational frequency range as the rotational frequency of the rotation mechanism, and rotate the rotation mechanism at the determined rotational frequency.

In order to solve the above-described problems and achieve the object, the invention provides a machining unit including a first machining device according to any one of the above devices, and a second machining device according to any one of the above devices that irradiates a position, which is irradiated with a laser beam from the first machining device, with a laser beam having the same pulse as or a shorter pulse than the laser beam output from the first machining device.

Additionally, it is preferable that the first machining device output the laser beam with a continuous output of 50 W or more and 2 kW or less and rotate the rotation mechanism at a rotational frequency of 1200 rpm or less, and the second machining device output the laser beam of 0.5 W or more and 500 W or less and rotate the rotation mechanism at a rotational frequency of 1200 rpm or more.

Additionally, it is preferable that the first machining device output the laser beam in a pulse with a peak output of 100 W or more and a pulse width of 1 nanosecond or more and rotate the rotation mechanism at a rotational frequency of 1200 rpm or less, and the second machining device output the laser beam of 0.5 W or more and 500 W or less and rotate the rotation mechanism at a rotational frequency of 1200 rpm or more.

Additionally, it is preferable that the first machining device output the laser beam in a pulse with a pulse width of 1 nanosecond or more, and the second machining device output the laser beam in a pulse with a pulse width of less than 1 nanosecond.

Additionally, it is preferable that the first machining device output the laser beam with a continuous output of 50 W or more and 2 kW or less and rotate the rotation mechanism at a rotational frequency of 120 rpm or more, and the second machining device output the laser beam in a pulse with 0.5 W or more and 50 W or less and a pulse width of less than 1 nanosecond and rotate the rotation mechanism at a rotational frequency of 1200 rpm or more.

In order to solve the above-described problems and achieve the object, the invention provides a machining method that irradiates a workpiece with a laser beam to perform cutting or boring machining of the workpiece. The machining method includes a rotational frequency range determining step of calculating an allowable rotational frequency range of the laser beam, on the basis of the relationship between an allowable thickness of a remelted layer of the workpiece and a rotational frequency or the relationship between an allowable thickness of an oxidization layer of the workpiece and the rotational frequency; a rotational frequency determining step of determining a rotational frequency included in the allowable rotational frequency range as the rotational frequency of a rotation mechanism; an outputting step of outputting the laser beam; a rotating step of rotating the light path of the laser beam around a rotational axis at the determined rotational frequency; and an irradiating step of irradiating the workpiece with the laser beam whose light path rotates around the rotational axis. The rotating step rotates the laser beam at a rotational frequency of 120 rpm or more.

Additionally, it is preferable that the rotating step integrally rotate a first prism that refracts the laser beam and a second prism that is arranged at a position facing the first prism to refract the laser beam, to thereby rotate the light path of the laser beam around the rotational axis.

Additionally, it is preferable that a laser output device output the laser beam in a pulse, and the rotational frequency determining step determine a rotational frequency at which the cycle of ON/OFF of a laser beam is a nonintegral multiple of the cycle of rotation of an irradiation position, as the rotational frequency of the rotation mechanism.

Additionally, it is preferable that the allowable thickness of the remelted layer of the workpiece or the allowable thickness of the oxidization layer of the workpiece be a preset value or a value calculated on the basis of at least one of the material, thickness, and machining conditions of the workpiece.

In order to solve the above-described problems and achieve the object, the invention provides a machining method that irradiates a workpiece with a laser beam to perform cutting or boring machining of the workpiece. The machining method includes an outputting step of outputting a first laser beam and a second laser beam having the same pulse as or a shorter pulse than the first laser beam; a rotational frequency range determining step of calculating an allowable rotational frequency range of the first laser beam, on the basis of the relationship between an allowable thickness of a remelted layer of the workpiece and a rotational frequency or the relationship between an allowable thickness of an oxidization layer of the workpiece and the rotational frequency; a rotational frequency determining step of determining a rotational frequency included in the allowable rotational frequency range as the rotational frequency of a rotation mechanism; a first rotating step of rotating the light path of the first laser beam around a rotational axis at the determined rotational frequency; and a first irradiating step of irradiating the workpiece with the first laser beam whose light path rotates around the rotational axis; a rotational frequency range determining step of calculating an allowable rotational frequency range of the second laser beam, on the basis of the relationship between the allowable thickness of the remelted layer of the workpiece and the rotational frequency or the relationship between the allowable thickness of the oxidization layer of the workpiece and the rotational frequency; a rotational frequency determining step of determining a rotational frequency included in the allowable rotational frequency range as the rotational frequency of the rotation mechanism; a second rotating step of rotating the light path of the second laser beam around a rotational axis at the determined rotational frequency; and a second irradiating step of irradiating the workpiece with the second laser beam whose light path rotates around the rotational axis. The first rotating step rotates the first laser beam at a rotational frequency of 120 rpm or more. The second rotating step rotates the second laser beam at a rotational frequency of 1200 rpm or more.

Additionally, it is preferable that the first rotating step integrally rotate a first prism and a second prism that refracts the first laser beam, to rotate the light path of the first laser beam around the rotational axis, and the second rotating step integrally rotate the first prism and the second prism that refracts the second laser beam, to rotate the light path of the second laser beam around the rotational axis. Additionally, it is preferable that the first rotating step integrally rotate the first prism that refracts the first laser beam and the second prism that is arranged at a position facing the first prism to refract the first laser beam, to rotate the light path of the laser beam around the rotational axis, and the second rotating step integrally rotate the first prism that refracts the second laser beam and the second prism that is arranged at a position facing the first prism and refracts the second laser beam, to rotate the light path of the laser beam around the rotational axis.

Additionally, it is preferable that the outputting step output the first laser beam with a continuous output of 50 W or more and 2 kW or less and output the second laser beam of 0.5 W or more and 500 W or less, the first rotating step rotate the first laser beam at a rotational frequency of 1200 rpm or less, and the second rotating step rotate the second laser beam at a rotational frequency of 1200 rpm or more.

Additionally, it is preferable that the outputting step output the first laser beam in a pulse with a peak output of 100 W or more and a pulse width of 1 nanosecond or more and output the second laser beam of 0.5 W or more and 50 W or less, the first rotating step rotate the first laser beam at a rotational frequency of 1200 rpm or less, and the second rotating step rotate the second laser beam at a rotational frequency of 1200 rpm or more.

Additionally, it is preferable that the outputting step output the first laser beam in a pulse with a pulse width of 1 nanosecond or more, and output the second laser beam in a pulse with a pulse width of less than 1 nanosecond.

Additionally, it is preferable that the outputting step output the first laser beam with a continuous output of 50 W or more and 2 kW or less and output the second laser beam in a pulse with 0.5 W or more and 50 W or less and a pulse width of less than 1 nanosecond, the first rotating step rotate the first laser beam at a rotational frequency of 120 rpm or more, and the second rotating step rotate the second laser beam at a rotational frequency of 1200 rpm or more.

Advantageous Effects of Invention

The invention exhibits the effect that high-precision machining can be performed with a simpler configuration. Additionally, the invention exhibits the effect that the device can be miniaturized.

DESCRIPTION OF EMBODIMENTS

Hereinafter, an embodiment of a machining device, a machining unit, and a machining method related to the invention will be described in detail with reference to the drawings. In addition, the invention is not limited by this embodiment. For example, although a case where a plate-shaped workpiece is machined is described in the present embodiment, the shape of the workpiece is not particularly limited. The shape of the workpiece can be various shapes. The workpiece is a member to be machined by the machining device or the machining unit. Additionally, although a case where a hole is formed in the workpiece or a case where the workpiece is linearly cut is described in the present embodiment, shapes other than the hole or the linear line, for example, a shape having an inflection point and a curved shape can also be adopted by adjusting a machining position on the workpiece, that is, the irradiation position of a laser beam. Additionally, in the present embodiment, the laser beam and the workpiece are relatively moved by moving the workpiece. However, the laser beam may be moved, or both of the laser beam and the workpiece may be moved. Additionally, a case where the machining device or the machining unit of the following embodiment irradiate the workpiece with the laser beam and perform cutting or boring machining of the workpiece will be described.

First Embodiment

Figure 1:
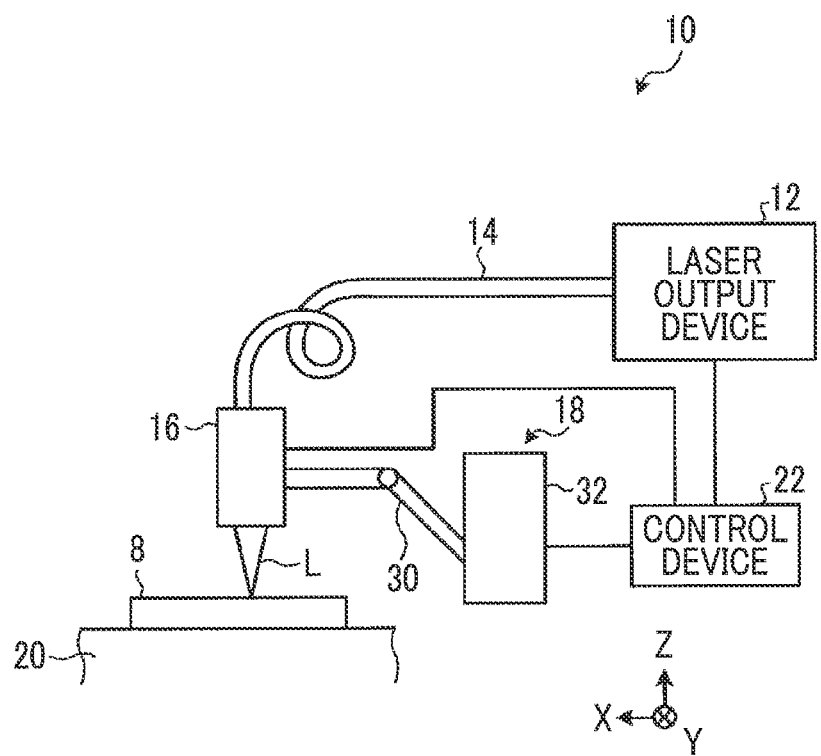
FIG. 1 is a schematic view showing a schematic configuration of a first embodiment of a machining device.
Figure 2:
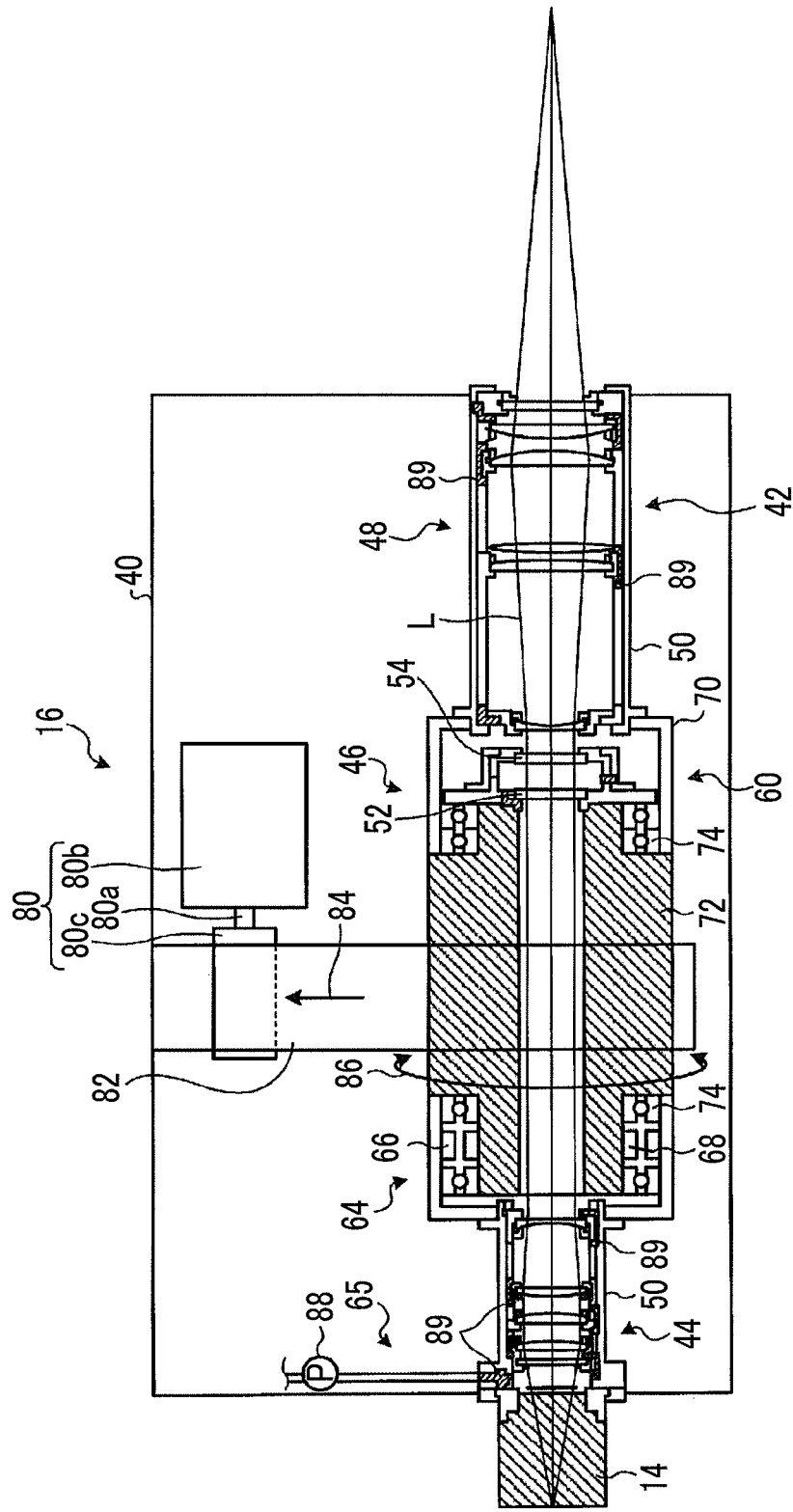
FIG. 2 is a schematic view showing a schematic configuration of an irradiating head shown in FIG. 1.
Figure 3:
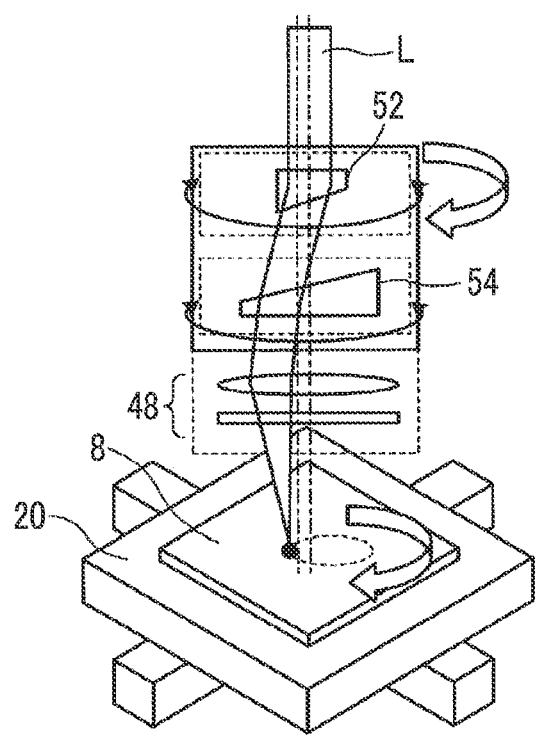
FIG. 3 is an explanatory view for illustrating the operation of the machining device.
Figure 4:
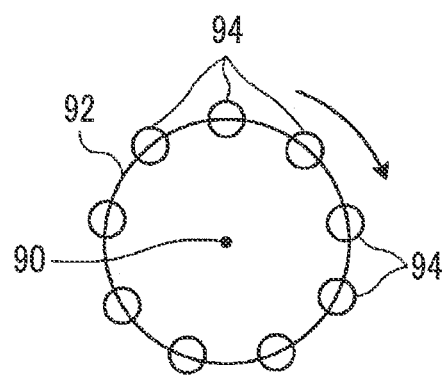
FIG. 4 is an explanatory view for illustrating the operation of the machining device.

FIG. 1 is a schematic view showing a schematic configuration of a first embodiment of a machining device. FIG. 2 is a schematic view showing a schematic configuration of an irradiating head shown in FIG. 1. FIG. 3 is an explanatory view for illustrating the operation of the machining device. FIG. 4 is an explanatory view for illustrating the operation of the machining device. A machining device 10, as shown in FIG. 1, has a laser output device 12, a guiding optical system 14, an irradiating head 16, a moving mechanism 18, a supporting base 20, and a control device 22. The machining device 10 irradiates a workpiece 8 installed on the supporting base 20 with a laser beam to machine the workpiece 8. Here, in this case, the machining device 10 has the surface of the workpiece 8 as an XY plane and has a direction orthogonal to the surface of the workpiece 8 as a Z direction.

Here, the workpiece 8 of the present embodiment is a plate-shaped member. As the workpiece 8, members made of various materials, for example, Inconel (registered trademark), Hastelloy (registered trademark), stainless steel, ceramic, steel, carbon steel, ceramics, silicon, titanium, tungsten, resin, plastics, glass, or the like can be used. Additionally, fiber-reinforced plastics, such as carbon fiber reinforced plastic (CFRP), glass fiber reinforced plastic (GFRP), and glass mat thermoplastic (GMT), iron alloys other than a steel sheet, various metals, such as an aluminum alloy, other composite materials, or the like can also be used for the workpiece 8.

The laser output device 12 is a device that outputs a laser beam. A fiber laser output device that outputs a laser beam, using an optical fiber for a medium, or a short pulse laser output device that outputs a short pulse laser beam can be used for the laser output device 12. As the fiber laser output device, a Fabry-Perot type fiber laser output device or a ring type fiber laser output device are exemplified. Additionally, the fiber laser output device may be a laser output device that uses any type of a continuous wave oscillation (continuous wave operation) type and a pulsed oscillation (pulsed operation) type. For example, silica glass to which rare earth elements (Er, Nd, Yb) are added can be used for the fiber of the fiber laser output device. Additionally, the short pulse is a pulse with a pulse width of 100 picoseconds or less. As a laser beam generation source of the short pulse laser output device, for example, a titanium sapphire laser can be used.

The guiding optical system 14 is an optical system that guides a laser beam output from the laser output device 12 to the irradiating head 16. The guiding optical system 14 of the present embodiment is an optical fiber. The guiding optical system 14 has one end portion connected to a laser beam emission port of the laser output device 12 and has the other end connected to the irradiating head 16. The guiding optical system 14 outputs a laser beam L output from the laser output device 12 toward an incident end of the irradiating head 16. In addition, the configuration of the guiding optical system 14 is not limited to this. The machining device 10 may reflect or condense a laser beam, using the combination of a mirror and a lens as the guiding optical system 14, and thereby guide the laser beam to the irradiating head 16.

The irradiating head 16 irradiates the workpiece 8 with the laser beam L output from the guiding optical system 14. Here, the irradiating head 16 rotates a light path of the laser beam L around a rotational axis, and thereby rotates an irradiation position on the workpiece 8. The irradiating head 16 moves the irradiation position of the laser beam L so as to draw a circle.

Hereinafter, the configuration of the irradiating head 16 will be described with reference to FIG. 2. The irradiating head 16, as shown in FIG. 2, has a housing 40, an optical system unit 42, an optical system supporting part 50, a rotation mechanism 60, an encoder 64, and a cooling mechanism 65. The housing 40 is a box that houses therein the optical system unit 42, the rotation mechanism 60, the encoder 64, and the cooling mechanism 65. In the irradiating head 16, the housing 40 supports respective parts on a fixed side.

The optical system unit 42 is a mechanism that guides the laser beam output from the guiding optical system 14. In the optical system unit 42, a collimating optical system 44, a deflecting optical system 46, and a condensing optical system 48 are arranged in order from the guiding optical system 14 side on the light path of the laser beam. That is, after the laser beam L output from the guiding optical system 14 passes through the collimating optical system 44, the laser beam passes through the deflecting optical system 46, passes through the condensing optical system 48, and is radiated to the workpiece 8. The collimating optical system 44 is provided with a collimator lens or the like, and makes the laser beam output from the guiding optical system 14 into parallel light.

The deflecting optical system 46 is an optical unit that shifts (deflects) the light path of the laser beam L by a fixed distance from a center, and has a first prism 52 and a second prism 54. The first prism 52 refracts the laser beam L to tilt the laser beam with respect to the center of the optical axis. The second prism 54 refracts the laser beam L refracted by the first prism 52 again to control a condensing position. Accordingly, the laser beam L passed through the deflecting optical system 46 as shown in FIG. 3 is output on a light path shifted with respect to the light path of the laser beam before the passage. The condensing optical system 48 has a lens that condenses the laser beam shifted from the center of the optical axis by the deflecting optical system 46.

The optical system supporting part 50 supports lenses of a fixed part of the optical system unit 42, specifically, supports lenses of the collimating optical system 44 and the condensing optical system 48. The optical system supporting part 50 is fixed to the housing 40. Additionally, the optical system supporting part 50 also supports a fixed part of the rotation mechanism 60 to be described below.

The rotation mechanism 60 is a mechanism that rotates the deflecting optical system 46 with the light path of the laser beam before the passage through the deflecting optical system 46 as a rotation center. The rotation mechanism 60 has a fixed part 70, a rotating part 72, a bearing 74, a motor 80, and a belt 82. The fixed part 70 is fixed to the housing 40. Additionally, the fixed part 70 is fixed to a predetermined position together with optical systems other than the deflecting optical system 46. The rotating part 72 is arranged inside the fixed part 70, and is supported by the fixed part 70 via the bearing 74. That is, the rotating part 72 is supported in a state where the rotating part is rotatable with respect to the fixed part 70. The rotating part 72 is a hollow tubular member in which a portion corresponding to the light path of the laser beam L serves as a space. The rotating part 72 supports the first prism and the second prism 54 of the deflecting optical system 46. The bearing 74 is arranged between the fixed part 70 and the rotating part 72. The bearing 74 of the present embodiment is a rolling bearing, such as a rolling ball bearing. The motor (driving source) 80 is arranged adjacent to the rotating part 72. The motor 80 has a stator 80a fixed to the housing 40, a rotor 80b rotated by the stator 80a, and a contact end 80c coupled to a tip of the rotor 80b. The belt (transmission element) 82 is a timing belt stretched to be hung on the contact end 80c of the rotor 80b of the motor 80 and the rotating part 72. In addition, the belt 82 has a rotating position adjusted by a tension adjusting mechanism for coupling the contact end 80c and the rotating part 72 with a predetermined tension.

The rotation mechanism 60 has the configuration as described above, and rotates the belt 82 in the direction of an arrow 84 or its opposite direction with a motor 80 to rotate the rotating part 72 in the direction of an arrow 86. As the rotation mechanism 60 rotates the rotating part 72, the deflecting optical system 46 can be rotated. The rotation center of the rotation mechanism 60 overlaps the center of the light path of the laser beam L before being deflected.

The rotation mechanism 60 can rotate the deflecting optical system 46 with the center of the light path of the laser beam L before being deflected as the rotation center, thereby moving the irradiation position of the laser beam L on the workpiece 8 with the center of the light path of the laser beam L before being deflected as a center in the shape of a circle having as a radius the distance deflected from the center by the deflecting optical system 46, as shown in FIG. 3. That is, the rotation mechanism can rotate the deflecting optical system 46, thereby moving an irradiation position 94 on an imaginary circle 92 centered on the center 90, as shown in FIG. 4.

The encoder 64 is a rotation sensor that detects the rotation of the rotating part 72 of the rotation mechanism 60. The encoder 64 has a detecting part 66 and a rotating part 68. The detecting part 66 is fixed to the fixed part 70. The rotating part 68 is fixed to the rotating part 72, and rotates together with the rotating part 72. The rotating part 68 is provided with an identifier serving as a mark at a position in a rotational direction. By detecting the identifier of the rotating part 68, the detecting part 66 can detect the rotation of the rotating part 68, and thereby can detect the rotation of the rotating part 72 with respect to the fixed part 70.

The cooling mechanism 65 has a pump 88 and a connecting pipe 89. The pump 88 is arranged inside the housing 40 and supplies air to an inflow portion of the connecting pipe 89. The connecting pipe 89 is a pipe that connects closed spaces between optical members of the optical system unit 42. The closed spaces between the optical members of the optical system unit 42 are connected together by the connecting pipe 89. The openings of the connecting pipe 89 connected with the spaces are arranged in the vicinity of the optical members. Additionally, the connecting pipe 89 has its own opening formed at a position apart from the opening of another connecting pipe 89 connected with the same space. By supplying air to the connecting pipe 89 with the pump 88, the cooling mechanism 65 can allow air to flow to the closed spaces between the optical members and can cool the optical members. In addition, since the cooling mechanism is connected so as to form one flow path with the connecting pipe 89, the pump 88 can supply air from one place to thereby allow air to flow to the whole.

The moving mechanism 18 has a driving source 32 that moves an arm 30 and an arm 30. The arms 30 support the irradiating head 16 at a tip. The driving source 32 can move the arms 30 in a θ direction in addition to triaxial XYZ directions. As the moving mechanism 18 moves the arms in the XYZ directions or the θ direction with the driving source 32, various positions of the workpiece 8 can be irradiated with the laser beam L. In addition, in the present embodiment, a mechanism that moves the irradiating head 16 with the arms 30 and the driving source 32 is used as the moving mechanism 18. However, a mechanism that moves the irradiating head 16 with an XY stage, an XYZ stage, or the like can also be used.

The supporting base 20 supports the workpiece 8 at a predetermined position. In addition, in the machining device 10, an XY stage that moves the workpiece 8 in XY directions may be used as the supporting base 20. The control device 22 controls the operation of the respective parts. The control device 22 adjusts various conditions of a laser beam to be output from the laser output device 12, moves the irradiating head 16 with the moving mechanism 18 to adjust the position of the irradiating head 16 with respect to the workpiece 8, or controls the rotational frequency of the motor 80 of the irradiating head 16 to control the rotational frequency of the laser beam. The machining device 10 has the configuration as described above.

The machining device 10 causes the laser beam L to be output from the laser output device 12. The machining device 10 guides the output laser beam L to the irradiating head 16 with the guiding optical system 14. As the machining device 10 rotates the deflecting optical system 46 with the rotation mechanism 60 of the irradiating head 16, the workpiece 8 is irradiated while the irradiation position of the laser beam L is rotated. Accordingly, the machining device 10, as shown in FIG. 4, can rotate the irradiation position 94 of the laser beam L in the shape of a circle.

The machining device 10 can rotate the irradiation position 94 of the laser beam L in the shape of a circle simply by rotating the deflecting optical system 46 with the rotation mechanism 60. Accordingly, the irradiation position 94 of the laser beam L can be rotated with a simple configuration, and the size and weight of the device can be reduced. Additionally, since the machining device 10 rotates only the deflecting optical system 46, a rotating part can be made small, and the size of the irradiating head can be reduced. Accordingly, the machining device 10 can attach the irradiating head 16 to the arms 30 as in the present embodiment, and machining can be easily executed. Additionally, since two prisms are integrally rotated, the irradiation position 94 can be moved with high precision even with a simple configuration. Additionally, since the machining device 10 has a configuration in which the deflecting optical system 46 is rotated by the rotation mechanism 60, the machining device can be used even under an environment in which assist gas is used.

Figure 5:
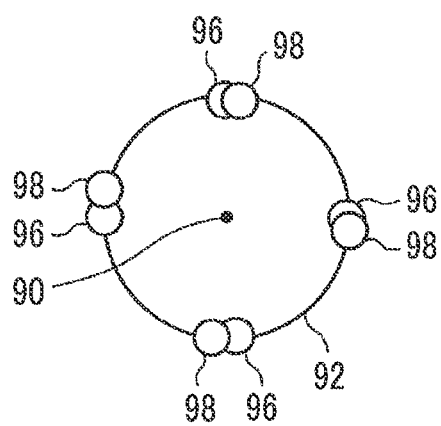
FIG. 5 is an explanatory view for illustrating the operation of the machining device.

FIG. 5 is an explanatory view for illustrating the operation of the machining device. Here, when the machining device 10 performs ON/OFF of a laser beam in a fixed cycle to radiate a laser beam, it is preferable that the cycle of ON/OFF of the laser beam be a nonintegral multiple of the cycle of rotation of the irradiation position. In this way, when the machining device 10 shifts the cycle of ON/OFF of the laser beam from the cycle of rotation of the irradiation position to thereby irradiate at irradiation position 96 with a laser beam while the deflecting optical system 46 is rotated one time by the rotation mechanism 60 as shown in FIG. 5, an irradiation position 98 can be irradiated with the laser beam in the next cycle. Accordingly, a region to be machined can be efficiently irradiated.

Here, it is preferable that the machining device 10 include a mechanism that adjusts the relative position of the two prisms. A relative angle and a relative distance can be used as the relative position. As the machining device 10 can adjust the relative position of the two prisms, the radius of a circle along which the irradiation position rotates can be adjusted. By adjusting the radius of the circle around which the irradiation position rotates, the machining bore diameter during machining can be adjusted. In the machining device 10, it is preferable that a passage region of a laser beam in an optical member on the downstream side (irradiation position side) of the deflecting optical system be made wide so as to be capable of responding to the distance of the light path of the laser beam shifted by the deflecting optical system.

That is, it is preferable to design the optical member on the downstream side (irradiation position side) of the deflecting optical system 46 on the assumption that a laser beam passes through a region wider than an optical member on the further upstream side. In addition, although the mechanism that moves the relative position may be manually operated, it is preferable to adopt a mechanism that can automatically perform adjustment by a driving force, such as a motor.

Additionally, in the machining device 10, it is preferable to rotate the deflecting optical system at 120 rpm or more with the rotation mechanism 60 when the oscillation frequency of a laser beam is less than 1 kHz, and it is preferable to rotate the deflecting optical system at 1200 rpm or more with the rotation mechanism when the oscillation frequency is 1 kHz or more. That is, in the machining device 10, it is preferable that the rotational frequency of the irradiation position of a laser beam be 120 rpm or more when the oscillation frequency of the laser beam is 1 kHz or less, and it is more preferable that the deflection optical system be rotated at 1200 rpm or more when the oscillation frequency is 1 kHz or more. By setting the rotational frequency of the deflecting optical system by the rotation mechanism 60 to the above range and setting the rotational frequency of the irradiation position of a laser beam to the above range, the machining device 10 can perform machining at a higher speed, and can further improve machining precision. That is, by setting the rotational frequency to a high speed, a laser beam can be more uniformly irradiated in a fixed range, and the output of the laser beam can be kept from being concentrated on a portion. Accordingly, the machining precision can be made high. Additionally, since a laser beam can be rotated at a high speed, thermal influence can be suppressed even if the output of the laser beam is made higher, and machining speed can be made fast while machining quality is maintained.

Additionally, in the machining device 10, atmospheric air may be used as air to be supplied by the cooling mechanism 65. However, it is preferable to use clean gas, such as nitrogen gas or dry air. Accordingly, degradation of the performance of the optical members can be suppressed.

Additionally, in the machining device 10, it is preferable to allow air to flow to the surfaces of the optical members, such as lenses, so that air is blown against the surfaces in the present embodiment. Additionally, in the above embodiment, the cooling mechanism 65 is an air-cooling mechanism. However, a water-cooling mechanism may be used. In this case, a cooling pipe may be supplied so as to cool the housing that supports the respective optical members.

The machining device is not limited to the above embodiment, and various embodiments can be made. Hereinafter, other embodiments will be described with reference to FIGS. 6 to 8.

Second Embodiment

Figure 6:
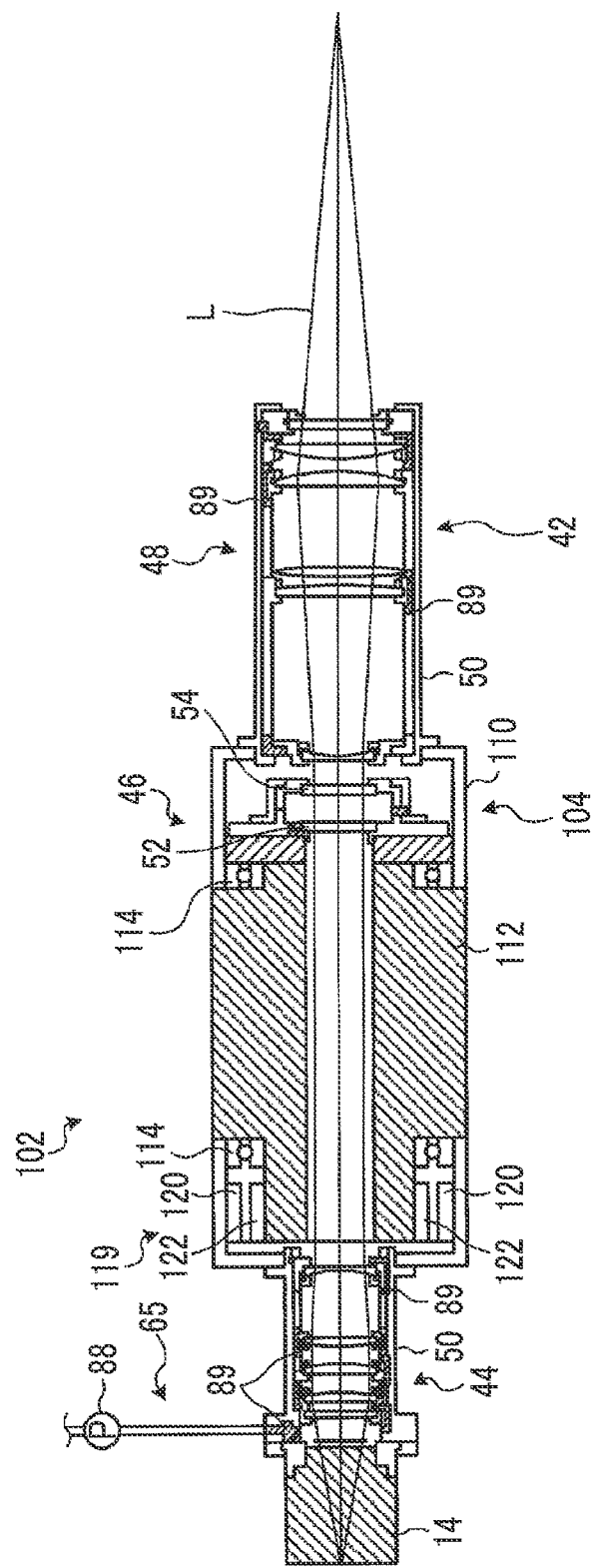
FIG. 6 is a schematic view showing a schematic configuration of an irradiating head of a second embodiment of the machining device.

FIG. 6 is a schematic view showing a schematic configuration of an irradiating head of a second embodiment of the machining device. In addition, the machining device of the second embodiment is the same as that of the machining device 10 of the first embodiment in other configurations excluding the structure of a rotation mechanism 104 of an irradiating head 102. The description of the same configuration as that of the machining device 10 will be omitted.

The rotation mechanism 104 of the irradiating head 102 has a fixed part 110, a rotating part 112, a bearing 114, and a motor 119. The fixed part 110, the rotating part 112, and the bearing 114 basically have the same configurations as the fixed part 70, the rotating part 72, and the bearing 74. The rotating part 112 supports the deflecting optical system 46 via an adapter plate. In the rotation mechanism 104, the motor 119 is arranged inside the fixed part 110. The motor 119 has a stator 120 and a rotor 122. An outer peripheral side of the stator 120 is fixed to the fixed part 110. The rotor 122 is arranged inside the stator 120. The rotor 122 has a hollow shape therein, has the rotating part 112 inserted into an internal diameter side thereof, and is fixed to the rotating part 112. As the motor 119 rotates the rotor 122, the rotating part 112 is rotated.

In the irradiating head 102, the motor 119 is arranged coaxially with the rotating part 112 and has a path through which the laser beam L passes provided therein, so that the size of the device can be further reduced. That is, since a driving source can also be arranged inside the fixed part 110, the housing 40 can also be made small or can be omitted.

Additionally, the irradiating head 102 is provided with an encoder to detect a rotating speed. Otherwise, the rotating speed can also be detected by detecting the counter-electromotive force of the motor 119 without the encoder.

Third Embodiment

Figure 7:
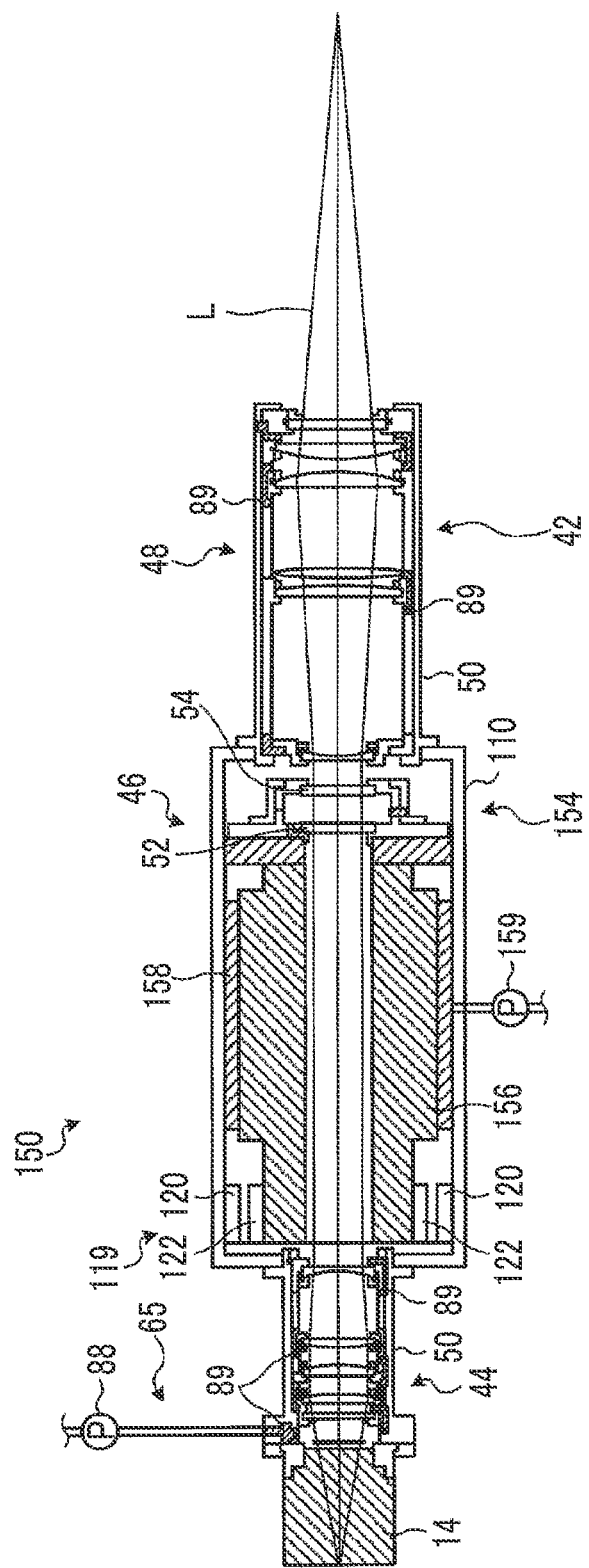
FIG. 7 is a schematic view showing a schematic configuration of an irradiating head of a third embodiment of the machining device.

FIG. 7 is a schematic view showing a schematic configuration of an irradiating head of a third embodiment of the machining device. In addition, the irradiation head of the machining device of the third embodiment is the same as the irradiation head 102 of the machining device of the second embodiment in other configurations excluding the structure of a rotation mechanism 154 of an irradiating head 150. The description of the same configuration as that of the irradiating head 102 will be omitted.

The rotation mechanism 154 of the irradiating head 150 has the fixed part 110, a rotating part 156, a bearing 158, and the motor 119. The fixed part 110, the rotating Part 156, and the motor 119 have the same configurations as the respective parts of the irradiating head 102. The bearing 158 is a hydrostatic bearing (fluid bearing), supplies air to a closed space between the fixed part 110 and the rotating part 156, and supports the rotating part 156 in a rotatable state with respect to the fixed part 110. The pump 159 supplies air to the bearing 158, and adjusts the air pressure between the fixed part 110 and the rotating part 156.

In the irradiating head 150, rotational precision can be further improved by using a hydrostatic bearing as the bearing 158. In addition, in the irradiating head 150, the configuration of the bearing may be appropriately adjusted according to intended use. Additionally, it is preferable that a porous hydrostatic bearing be used as the bearing 158 of the irradiating head 150. Accordingly, even if the machining device is moved in a state where the machining device has been rotated, there is little risk that the bearing may be burned out due to seizure or the like. Additionally, the machining device may be provided with both the rolling bearing and the hydrostatic bearing as the bearing. In this case, in the machining device, the pressure of the hydrostatic bearing between the fixed part 110 and the rotating part 156 is made high when high-precision machining is required (in the case of machining that requires a rotational precision of 0.05 μm or less), and the pressure of the hydrostatic bearing between the fixed part 110 and the rotating part 156 may be made low and the fixed part 110 and the rotating part 156 may be supported by a rolling bearing when precision is not required.

Figure 8:
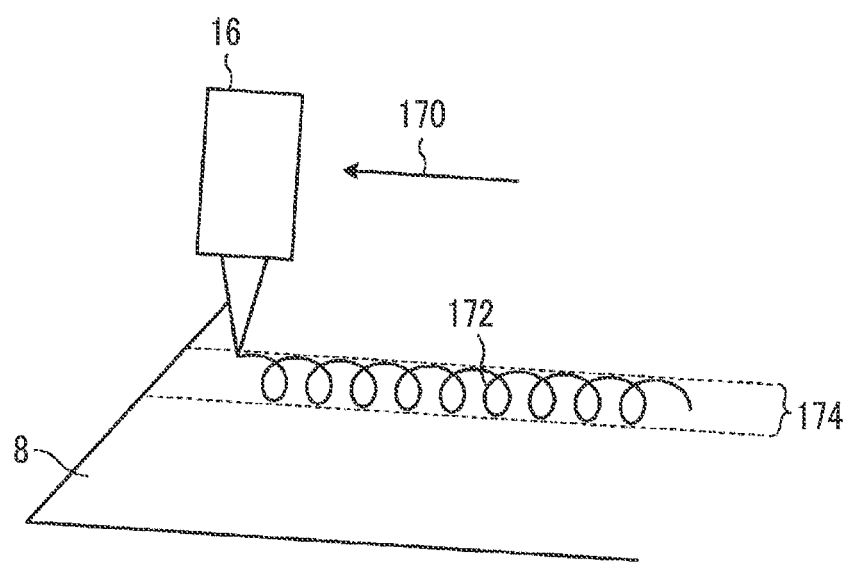
FIG. 8 is an explanatory view for illustrating the operation of the machining device.

FIG. 8 is an explanatory view for illustrating the operation of the machining device. The machining device, as shown in FIG. 8, can cause the irradiating head 16 to perform scanning in the direction of an arrow 170, thereby moving the irradiation position in one direction while being rotated as shown by a line segment 172. Accordingly, a line with width 174 can be machined in the workpiece 8, for example, the workpiece 8 can also be cut.

Figure 9:
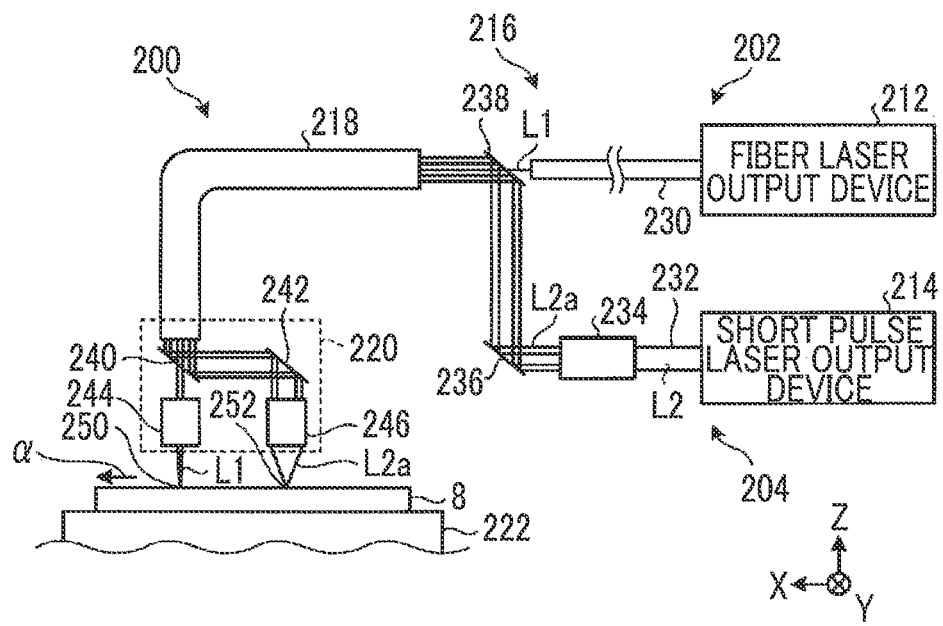
FIG. 9 is a schematic view showing a schematic configuration of a machining unit using a machining device.
Figure 10:
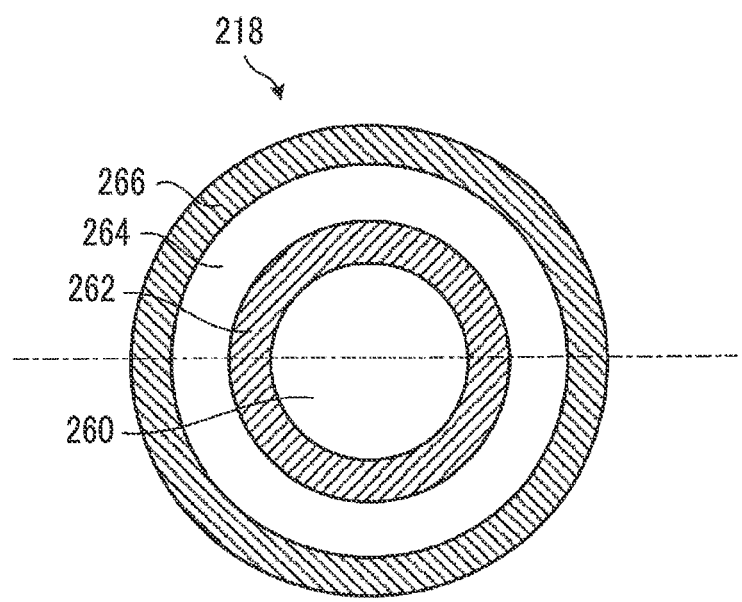
FIG. 10 is a cross-sectional view showing a schematic configuration of an optical fiber.
Figure 11:
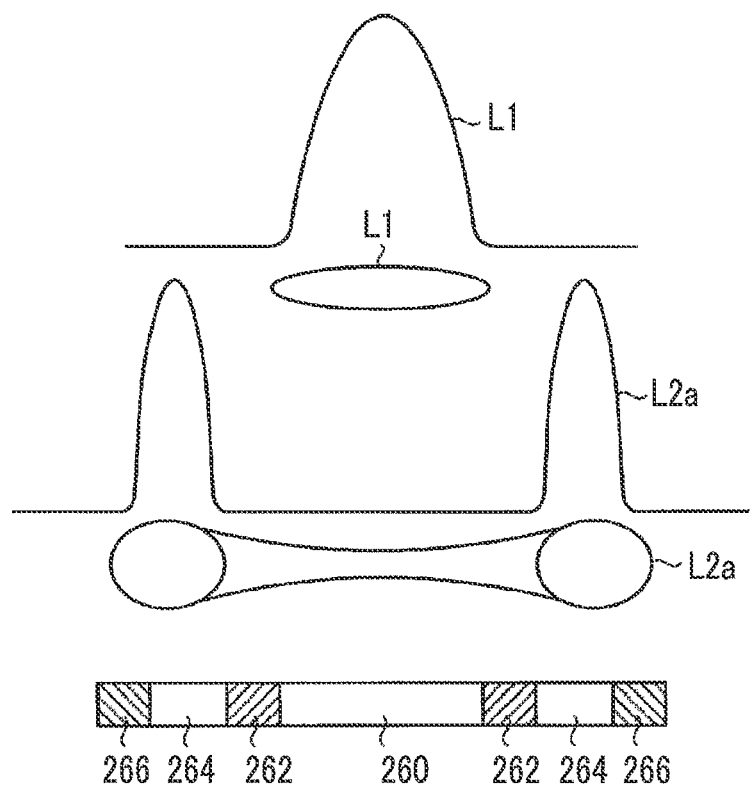
FIG. 11 is an explanatory view for illustrating the power distribution of laser beams guided by the optical fiber.
Figure 12:
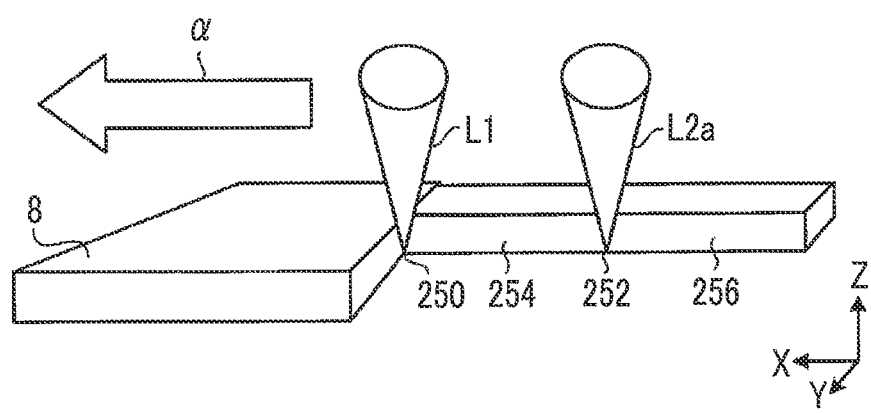
FIG. 12 is an explanatory view for illustrating the operation of the machining unit.
Figure 13:
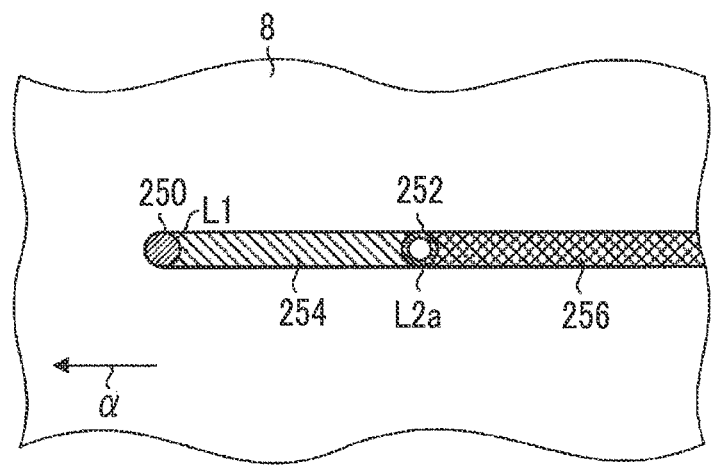
FIG. 13 is an explanatory view for illustrating the operation of the machining unit.

Next, a machining unit having two machining devices as a modification example of the machining device will be described. FIG. 9 is a schematic view showing a schematic configuration of the machining unit. FIG. 10 is a cross-sectional view showing a schematic configuration of an optical fiber. FIG. 11 is an explanatory view for illustrating the power distribution of laser beams guided by the optical fiber. FIG. 12 is an explanatory view for illustrating the operation of the machining unit. FIG. 13 is an explanatory view for illustrating the operation of the machining unit. A machining unit 200, as shown in FIG. 9, has a fiber laser output device (first laser output device) 212, a short pulse laser output device (second laser output device) 214, a laser guiding optical system 216, an optical fiber 218, an irradiation mechanism 220, and a moving mechanism 222. Here, in the machining unit 200, the combination of the fiber laser output device (first laser output device) 212, the laser guiding optical system 216, the optical fiber 218, and the irradiation mechanism 220 serves as a first machining device 202. Additionally, in the machining unit 200, the combination of the short pulse laser output device (second laser output device) 214, the laser guiding optical system 216, the optical fiber 218, and the irradiation mechanism 220 serves as a second machining device 204. That is, the machining unit 200 has a configuration in which some of the laser guiding optical system 216, the optical fiber 218, and the irradiation mechanism 220 are supplied by two machining devices.

The machining unit 200 irradiates the workpiece 8 installed on the moving mechanism 222 with a laser beam to machine the workpiece 8. Here, in this case, the machining unit 200 has the surface of the workpiece 8 as an XY plane and has a direction orthogonal to the surface of the workpiece 8 as a Z direction. In addition, the machining unit 200 has a scanning direction (a relative movement direction between the workpiece 8 and a laser beam) of a machining position as an X direction. The workpiece 8 is the same plate-shaped member as that of the above-described embodiment.

The fiber laser output device (first laser output device) 212 is a device that outputs a laser beam, using an optical fiber as a medium. The fiber laser output device 212 outputs a first laser beam L1. As the fiber laser output device 212, a Fabry-Perot type fiber laser output device or a ring type fiber laser output device can be used. Additionally, the fiber laser output device 212 may be a laser output device that uses any type of a continuous wave oscillation (continuous wave operation) type and a pulsed oscillation (pulsed operation) type. For example, silica glass to which rare earth elements (Er, Nd, Yb) are added can be used for the fiber of the fiber laser output device 212.

The short pulse laser output device (second laser output device) 214 is a device that outputs a short pulse laser beam. The short pulse laser output device 214 outputs a second laser beam L2 in a short pulse. Here, the short pulse is a pulse with a pulse width of 100 picoseconds or less. As a laser beam generation source of the short pulse laser output device 214, for example, a titanium sapphire laser can be used.

The laser guiding optical system 216 is an optical system that guides the first laser beam L1 output from the fiber laser output device 212 and the second laser beam L2 output from the short pulse laser output device 214 to the optical fiber 218. The laser guiding optical system 216 has an optical fiber 230, an optical fiber 232, an axicon lens unit 234, a reflecting member 236, and a half mirror 238. The laser guiding optical system 216 guides the first laser beam L1 with the optical fiber 230, and guides the second laser beam L2 with the optical fiber 232, the axicon lens unit 234, the reflecting member 236, and the half mirror 238. Additionally, the laser guiding optical system 216 deforms the shape of the second laser beam L2 output from the short pulse laser output device 214 with the optical system to which the laser beam is to be guided, so as to be a hollow ring shape.

The optical fiber 230 has one end portion connected to the fiber laser output device 212 and has the other end facing the incident end of the optical fiber 218. The optical fiber 230 outputs the first laser beam L1 output from the fiber laser output device 212 toward the incident end of the optical fiber 218. In addition, the half mirror 238 is arranged between the optical fiber 230 and the optical fiber 218. In addition, the optical fiber 230 may be a portion of an optical fiber of the fiber laser output device 212.

The optical fiber 232 has one end portion connected to the short pulse laser output device 214 and has the other end facing the incident end of the axicon lens unit 234. The optical fiber 232 outputs the second laser beam L2 output from the short pulse laser output device 214 toward the incident end of the axicon lens unit 234. In addition, the optical fiber 232 may not be necessarily provided.

The axicon lens unit 234 is arranged between the optical fiber 232 and the reflecting member 236. The axicon lens unit 234 is a lens in which conical portions of two axicon lenses are arranged in opposed orientation, an optical member that forms the circle shape of incident light (beam) in a ring shape (an annular shape or a cylindrical shape), that is, a shape having an empty hole at the center of the beam. The axicon lens unit 234 outputs the incident second circular laser beam L2 as a ring-shaped second laser beam L2a.

The reflecting member 236 reflects a second laser beam L2a output from the axicon lens unit 234 toward the half mirror 238. The half mirror 238 is an optical member that transmits the first laser beam L1 and reflects the second laser beam L2a. The half mirror 238 is arranged on the light path of the first laser beam L1 as described above. The half mirror 238 reflects a second laser beam L2a reflected from the reflecting member 236 toward the optical fiber 218. Here, the reflected second laser beam L2a becomes light that advances in a direction parallel to the first laser beam L1. Additionally, the first laser beam L1 serves as light that advances in a ring-shaped hollow portion (hole portion) of the second laser beam L2a.

The laser guiding optical system 216 has the configuration as described above, and adjusts the position and orientation of two laser beams to cause the laser beams to be incident on the optical fiber 218 so that the second laser beam L2 serves as the ring-shaped second laser beam L2a and the first laser beam L1 passes through the hollow portion of the second laser beam L2a.

The optical fiber 218 is a light guide member (waveguide member) that guides the first laser beam L1 and second laser beam L2a to the irradiation mechanism 220. The optical fiber 218 is a so-called switch core fiber that separately guides the first laser beam L1 and the second laser beam L2a. The cross-sectional shape of the optical fiber 218, as shown in FIG. 10, is constituted by a first core layer 260, a cladding layer 262, a second core layer 264, and a cladding layer 266. The first core layer 260, the cladding layer 262, the second core layer 264, and the cladding layer 266 are concentrically arranged in this order from a radial inner side toward a radial outer side. That is, in the optical fiber 218, the cladding layer 262 is arranged between the first core layer 260 and the second core layer 264, and the outside of the second core layer 264 is covered with the cladding layer 266. In this way, the first core layer 260 has the cladding layer 262 arranged at an outer periphery thereof, and the cross-section thereof has a solid circle shape. The second core layer 264 has the cladding layer 262 arranged at an inner periphery thereof, has the cladding layer 266 arranged at an outer periphery thereof, and the cross-section thereof has a ring shape. The first core layer 260 and the second core layer 264 are formed by an optical member that transmits light. The cladding layer 262 is formed by a member in which both surfaces (an inner peripheral surface and an outer peripheral surface) of a surface reflect light. The cladding layer 266 is formed by a member whose inner peripheral surface reflects light.

As the optical fiber 218 guides a light beam that has entered the first core layer 260 and the light beam that has entered the second core layer 264 while the light beams being reflected by the cladding layers 262 and 266, two light beams can be separately guided. In the optical fiber 218, the first laser beam L1 enters the first core layer 260 arranged on a center side of the cross-section, and the ring-shaped second laser beam L2a guided at a position where the outer periphery of the first laser beam L1 is surrounded enters the second core layer 264 arranged on an external diameter side of the cross-section. Accordingly, the intensity distribution of the light guided by the optical fiber 218 becomes the distribution shown in FIG. 11. The optical fiber 218 guides the first laser beam L1 having a larger output toward the center with the first core layer 260. Additionally, the optical fiber 218 guides the second laser beam L2a having ring-shaped power distribution with the second core layer 264. From the above, the optical fiber 218 causes the first laser beam L1 that has entered from one end portion (a surface facing the half mirror 238) of the first core layer 260 to be output from the other end (a surface facing the irradiation mechanism 220).

The optical fiber 218 causes the ring-shaped second laser beam L2a that has entered from one end portion (the surface facing the half mirror 238) of the second core layer 264 to be output in a ring shape from the other end (the surface facing the irradiation mechanism 220).

The irradiation mechanism 220 is a mechanism that separates the first laser beam L1 and the second laser beam L2a output from the optical fiber 218, irradiates an irradiation position 250 with the first laser beam L1, and irradiates an irradiation position 252 with the second laser beam L2a. The irradiation mechanism 220 has a half mirror 240, reflecting member 242, and irradiating heads 244 and 246.

The half mirror 240 is an optical member that transmits the first laser beam L1 and reflects the second laser beam L2a. The half mirror 240 is arranged at a position that faces an emission surface of the optical fiber 218. The half mirror 240 transmits the first laser beam L1 output from the optical fiber 218, and the half mirror 240 reflects the second laser beam L2a output from the optical fiber 218 toward the reflecting member 242. The reflecting member 242 reflects the second laser beam L2a reflected by the half mirror 240 toward the irradiation position 252.

The irradiating head 244 is arranged between the half mirror 240 and the irradiation position 250. The irradiating head 244 has the same configuration as the above-described irradiating head, and periodically changes a direction, in which the first laser beam L1 passed through the half mirror 240 is deflected, to thereby rotate the irradiation position 250. Accordingly, the first laser beam L1 passed through the irradiating head 244 reaches the irradiation position 250. Additionally, the irradiation position 250 rotates around a rotational axis thereof. The irradiating head 246 is arranged between the reflecting member 242 and the irradiation position 252. The irradiating head 246 has the same configuration as the above-described irradiating head, and periodically changes a direction, in which the second laser beam L2a reflected by the reflecting member 242 is deflected, to thereby rotate the irradiation position 252. Accordingly, the second laser beam L2a passed through the irradiating head 246 reaches the irradiation position 252. Additionally, the irradiation position 252 rotates around a rotational axis thereof.

The moving mechanism 222 supports the workpiece 8, and moves the workpiece 8 in a predetermined direction with respect to the irradiation mechanism 220, and in the present embodiment, in the direction of an arrow a. In addition, the moving mechanism 222 can move the workpiece 8 in directions other than the direction of the arrow a, that is, in triaxial XYZ directions, respectively.

The machining unit 200 causes the first laser beam L1 to be output from the fiber laser output device 212, and causes the second laser beam L2 to be output from the short pulse laser output device 214. The machining unit 200 guides the output first laser beam L1 and second laser beam L2 to the optical fiber 218 with the laser guiding optical system 216. The laser guiding optical system 216 obtains the ring-shaped second laser beam L2a while guiding the second laser beam L2. The machining unit 200 causes the first laser beam L1 guided by the laser guiding optical system 216 to enter the first core layer 260 of the optical fiber 218, and causes the second laser beam L2a to enter the second core layer 264. The machining unit 200 separates the first laser beam L1 and the second laser beam L2a guided and emitted by the optical fiber 218, respectively, with the irradiation mechanism 220, irradiates the irradiation position 250 with the first laser beam L1, and irradiates the irradiation position 252 with the second laser beam L2. Additionally, the machining unit 200 rotates the irradiation positions 250 and 252 in a predetermined cycle with the irradiating heads 244 and 246. Additionally, the machining unit 200 moves the workpiece 8 in the direction of the arrow a with the moving mechanism 222 while the irradiation positions 250 and 252 are irradiated with laser beams.

Accordingly, as the machining unit 200, as shown in FIGS. 12 and 13, irradiates the irradiation position 250 with the first laser beam L1 and irradiates the irradiation position 252 with the second laser beam L2a, the workpiece 8 can be machined at the irradiation positions 250 and 252. Additionally, as the machining unit 200 rotates the respective irradiation positions 250 and 252, the above-described effects can be obtained.

Additionally, the machining unit 200 moves the workpiece 8 with the moving mechanism 222 whereby the irradiation position 250 and the irradiation position 252 on the workpiece 8 are moved in the direction of the arrow a. Accordingly, in the machining unit 200, an arbitrary portion of the workpiece 8 passes through the irradiation position 250, and serves as a machined region 254 machined with the first laser beam L1. Additionally, in the machining unit 200, a portion serving as the machined region 254 of the workpiece 8 passes through the irradiation position 252, and serves as a machined region 256 machined with second laser beam L2a. That is, the machining unit 200 irradiates and machines (finish-machine) the portion to be machined of the workpiece 8 with the second laser beam L2a after being irradiated and machined with the first laser beam L1 (rough machining). Accordingly, the machining unit 200 cuts or bores the region to be machined of the workpiece 8.

As described above, as the machining unit 200 performs rough machining of the workpiece 8 with the first laser beam L1 output from the fiber laser output device 212 and performs finish machining with the ring-shaped second laser beam L2a having a lower output than the first laser beam L1, the machining precision of the workpiece 8 can be made high. As the machining unit 200 performs machining with the first laser beam L1, the workpiece 8 can be machined (cut, bored) in a short time, and then, as the machining unit performs machining with second laser beam L2a, the thermal influence on a machined end surface can be eliminated and reduced.

As the machining unit 200 forms the second laser beam L2a performing finish machining in a ring shape, the second laser beam L2a can be a laser beam formed by a peripheral portion with a high output strength, and machining can be efficiently performed. Accordingly, the second laser beam output from the short pulse laser output device 214 can be efficiently used, energy efficiency can be improved, and machining time can be a shorter time.

Additionally, as the machining unit 200 uses a laser beam output in a short pulse as the second laser beam L2a, finish machining can be performed with higher precision.

Additionally, as the machining unit 200 performs the above machining, using the fiber laser output device 212 and the short pulse laser output device 214, the workpiece 8 can be suitably machined even if assist gas is not used or with a small amount of assist gas. In addition, although the workpiece 8 can be suitably machined even if the machining unit 200 does not use assist gas, machining can be similarly performed even if assist gas, such as nitrogen or oxygen, is used. As the machining device 10 uses assist gas, such as nitrogen and oxygen, depending on the material or the like of the workpiece, machining speed may be made faster. In this way, the machining unit 200 may be further provided with assist gas supply means for supplying assist gas to the irradiation position of a laser beam.

Additionally, as the machining unit 200 guides the first laser beam L1 and the second laser beam L2a, using one optical fiber 218 in which two core layers are concentrically arranged, the mechanism that guides the two laser beams can be simplified. Accordingly, the configuration of the device can be simplified. Specifically, light paths of laser beams can be light paths other than the linear light path by using the optical fiber 218. Accordingly, the degree of freedom of light paths from the output positions of laser beams from the fiber laser output device 212 and the short pulse laser output device 214 to the incident positions of the laser beams to the irradiation mechanism 220 can be improved. That is, the configuration of the device can be simplified, and handling can be simplified. Additionally, the orientation of a laser beam at an incident position with respect to the orientation of a laser beam at an output position can be changed by one optical fiber 218. That is, even when a mirror or the like is not used, the orientation and position of a laser beam can be changed. Accordingly, a laser beam can be guided to a desired position with a simple device configuration. Additionally, a linear portion provided within the device to allow a laser beam to pass therethrough can be reduced. Additionally, as the machining unit 200 uses the optical fiber 218, two laser beams can be coaxially guided while suppressing the interference of one laser beam with the other laser beam. Accordingly, even when two laser beams are guided in an arrangement where the second laser beam L2a surrounds an outer periphery of the first laser beam L1 in a cross-section of a light path, the two laser beams can be suitably guided.

Moreover, as the machining unit 200 uses the optical fiber 218, the shift of the optical system that guides the first laser beam and the second laser beam can be made not to occur easily. Specifically, by guiding the laser beams inside the optical fiber, the shift of a relative position from an optical system, such as a lens, can be made not to occur easily, and it is possible to suppress the shift of the optical axis due to vibration or operator's interference. Additionally, as the machining unit 200 uses the optical fiber 218, safety can be made high. Specifically, by allowing a laser beam to machine the workpiece 8 to pass through the optical fiber 218, a region where the laser beam is exposed can be reduced. Accordingly, it is possible to suppress the irradiation of an unexpected portion with a laser beam, and safety can be made high. Additionally, as the machining unit 200 uses the optical fiber 218, maintenance can be facilitated. Additionally, as the machining unit 200 uses the optical fiber 218, replacement of the optical system that guides a laser beam can be cheaply performed, and maintenance costs can be reduced.

Additionally, as the machining unit 200 guides the second laser beam L2a with the second core layer 264 on the further outer peripheral side, the ring-shaped second laser beam L2a can be guided in a ring shape. Accordingly, the ring-shaped second laser beam L2a can be irradiated to the irradiation position 252, finish machining of the workpiece 8 can be suitably performed, and the machining precision can be improved.

In addition, the machining unit 200 may be provided with a ring type reflecting member in which a portion where the first laser beam L1 reaches is transparent or hollow and a reflecting member is arranged at a portion where the second laser beam L2a reaches, instead of the half mirrors 238 and 240. In this way, even if the configuration in which the reflecting member is selectively provided is adopted, light paths of two laser beams can be concentrically located, or two concentric laser beams can be separated.

Here, it is preferable that the short pulse laser output device 214 output a laser beam of a pulse with a pulse width of less than 1000 femtoseconds. In the machining unit 200, as the pulse width of a laser beam output from the short pulse laser output device 214 is set to less than 1000 femtoseconds, the precision of finish machining by the second laser beam L2a can be further improved.

It is preferable that the short pulse laser output device 214 output a laser beam in a pulse with a frequency of 1 kHz or more. In the machining unit 200, as the frequency of the pulse of a laser beam output from the short pulse laser output device 214 is set to 1 kHz or more, the precision of finish machining by the second laser beam L2a can be further improved.

It is preferable that the short pulse laser output device 214 output a laser beam in a time period with a pulse width that is shorter than 100 picoseconds. In the machining unit 200, as the pulse width of the pulse of a laser beam output from the short pulse laser output device 214 is set to a time that is shorter than 100 picoseconds, the precision of finish machining by the second laser beam L2a can be further improved.

Here, it is preferable that the output of the first laser beam be set to 50 W or more 2 kW or less. By setting the output of the first laser beam to the above range, a workpiece can be appropriately rough-machined in a short time. It is preferable that the output of the second laser beam be set to 0.5 W or more and 50 W or less. By setting the output of the second laser beam to the above range, a workpiece can be appropriately finish-machined in a short time, and thermal influence can be suitably reduced or removed.

Additionally, in the machining unit 200, it is preferable that the output of the first laser beam L1 output from the fiber laser output device 212, the type of laser beam, or the output, frequency, pulse width, or the like of the second laser beam L2 output from the short pulse laser output device 214 be adjustable. Accordingly, the machining unit 200 can output the suitable first laser beam L1 and the suitable second laser beam L2 corresponding to the thickness, material, machining time, allowed machining precision, or the like of the workpiece 8 to be machined. Accordingly, the machining unit 200 can machine a workpiece with more suitable precision in a short time.

In the machining device, the angle formed between the traveling direction of the second laser beam L2a and the traveling direction of the first laser beam L1 may be larger than 0 degrees in a plane orthogonal to the arrow a. That is, in the plane orthogonal to the arrow a, the traveling direction of the second laser beam L2a may incline with respect to the traveling direction of the first laser beam L1. In addition, in the plane orthogonal to the arrow a, the second laser beam L2a inclines in a direction in which a laser beam can be radiated toward a target cut surface to be machined.

In this way, in the machining device, the whole cut surface (surface parallel to the traveling direction of the first laser beam L1) can be easily irradiated with the second laser beam L2a by inclining the traveling direction of the second laser beam L2a with respect to the traveling direction of the first laser beam L1. Accordingly, the thermal influence of a surface machined by radiating the first laser beam L1 can be more suitably reduced or removed. Additionally, by setting the angle formed between the traveling direction of the second laser beam L2a and the traveling direction of the first laser beam L1 to less than 90 degrees, a target cut surface can be easily irradiated with the second laser beam L2a even when a surface where a cut surface is not formed remains in a surface machined and cut (divided) with the first laser beam L1. Accordingly, for example, even if a guide member for exposing a cut surface by deforming a cut portion is not provided, a target cut surface can be irradiated with the second laser beam L2a, and the whole cut surface can be easily irradiated with the second laser beam L2.

Additionally, in the machining unit 200 of the above embodiment, the axicon lens unit 234 is used as an optical member that forms the second laser beam L2 in a ring shape. However, the invention is not limited to this. The machining unit 200 may be able to cause the second laser beam L2 output from the short pulse laser output device 214 to selectively enter the ring-shaped second core layer 264 of the optical fiber 218. For example, in the machining unit 200, the second laser beam L2 may be formed in a ring shape by arranging an absorption member (black plate) that absorbs a component of a center portion of the second laser beam L2 or a reflecting member that reflects the component of the center portion of the second laser beam L2, on the light path of the second laser beam L2 output from the short pulse laser output device 214, and passing only a partial region on an external diameter side of the second laser beam L2. Additionally, the axicon lens unit 234 is used as an optical member that forms the first laser beam L1 of the machining unit 200 in a ring shape. However, the invention is not limited to this. The optical member that forms the first laser beam L1 in a ring shape can have various configurations, similar to the optical member that forms the second laser beam L2 in a ring shape.

In the machining unit 200 of the above embodiment, a fiber laser beam is used as a laser beam that performs rough machining, using the fiber laser output device 212, that is, as a laser beam to be radiated to the workpiece 8 in advance. However, the invention is not limited to this. The machining unit 200 may use laser output devices other than the fiber laser output device 212. For example, a $CO_2$ laser output device may be used as a laser output device that outputs a laser beam that performs rough machining.

In the machining unit 200 of the above embodiment, a short pulse laser beam is used as a laser beam that performs rough machining, using the short pulse laser output device 214, that is, as a laser beam to be radiated to the workpiece 8 next. However, the invention is not limited to this. The machining unit 200 may use laser output devices other than the short pulse laser output device 214. For example, an excimer laser output device may be used as a laser output device that outputs a laser beam that performs finish machining.

In the machining unit 200 of the above embodiment, two laser beams are caused to be output by two output devices of the fiber laser output device 212 and the short pulse laser output device 214. However, the invention is not limited to this. In the machining unit 200, a laser beam output from one laser output device may be branched into two laser beams, and the respective laser beams may be used as the first laser beam and the second laser beam having a weaker output than the first laser beam. In this case, as the laser output device is provided with an optical member that branches an output laser beam depending on wavelength or an output ratio, the laser beam can be branched into two. Additionally, in the machining unit 200, it is preferable that the second laser beam be a laser beam having, the same pulse (that is, the same waveform or wavelength) as or a shorter pulse than the first laser beam.

Although the machining unit 200 of the above embodiment irradiates the workpiece 8 with two types of the first laser beam performing rough machining and the second laser beam performing finish machining in order, to thereby machine the workpiece 8, the invention is not limited to this. In the machining device 10, the laser beam that performs rough machining, that is, the laser beam before finish machining is performed may be a plurality of types. That is, the irradiation position of the laser beam that performs rough machining may be a plurality of positions. In the machining unit 200, for example, when a member in which two layers of a first layer with low thermal durability and a second layer with high thermal durability are laminated is machined, the laser beam for rough machining may be divided into two laser beams of a laser beam for cutting the first layer of the workpiece 8 and a laser beam for cutting the second layer. In this case, the laser beam for the first layer may be radiated to the workpiece 8 in an out-of-focus state. Accordingly, the first layer with a certain range of low durability can be cut. Additionally, the laser beam for the second layer may be radiated to the workpiece in an in-focus state. Accordingly, the second layer with high durability can be suitably cut. Additionally, in the machining unit 200, the irradiation position of the laser beam that performs finish machining may be a plurality of positions so as to perform the finish machining with a plurality of laser beams.

When the machining unit 200 irradiates three or more multiple irradiation positions with laser beams, a laser beam output from one laser output device may be branched into two and be used as two laser beams. In this case, a laser beam may be split into two depending on wavelength, and the output of a laser beam may be simply separated into two. In addition, in the machining unit 200, when the laser beams of the same wavelength are used as the multiple laser beams, it is preferable to reflect and separate the plurality of laser beams, which are coaxially guided by the optical fiber 218, with reflecting members arranged at positions corresponding to regions of the respective laser beams. Accordingly, even in the case of the laser beams of the same wavelength, the laser beams can be separated by the respective core layers of the optical fiber through which the laser beams pass. Additionally, the optical fiber 218 can coaxially and separately guide three or more laser beams by increasing core layers according to the number of laser beams. Accordingly, the mechanism that guides a laser beam can be simplified, and the device can be simplified.

As the machining unit 200 of the above embodiment is used for machining of a steel sheet, the steel sheet can be suitably cut, and the shape of a cut surface can be a more suitable shape. Accordingly, the machining precision can be made high. Since the machining device 10 can obtain the above effects, it is preferable to use metallic materials, such as the steel sheet, as the workpiece. However, the invention is not limited to this. In the machining device 10, the above-described various materials can be used as the workpiece. In addition, since the same effects as those of the steel sheet can be obtained from the various materials, it is preferable that the machining device 10 be used for various materials that need to be machined with thermal influence (influence of thermal damage) being reduced or eliminated.

Here, it is preferable that the first machining device output the first laser beam with a continuous output of 50 W or more and 2 kW or less and rotate the rotation mechanism at a rotational frequency of 1200 rpm or less, and the second machining device output the second laser beam of 0.5 W or more and 500 W or less and rotate the rotation mechanism at a rotational frequency of 1200 rpm or more.

Additionally, it is preferable that the first machining device output the first laser beam in a pulse with a peak output of 100 W or more and a pulse width of 1 nanoseconds or more and rotate the rotation mechanism at a rotational frequency of 1200 rpm or less, and the second machining device output the second laser beam of 0.5 W or more and 50 W or less and rotate the rotation mechanism at a rotational frequency of 1200 rpm or more.

Additionally, it is preferable that the first machining device output the first laser beam in a pulse with a pulse width of 1 nanosecond or more, and the second machining device output the second laser beam in a pulse with a pulse width of less than 1 nanosecond.

Additionally, it is preferable that the first machining device output the first laser beam with a continuous output of 50 W or more and 2 kW or less and rotate the rotation mechanism at a rotational frequency of 120 rpm or more, and the second machining device output the second laser beam in a pulse with 0.5 W or more and 50 W or less and with a pulse width of less than 1 nanosecond and rotate the rotation mechanism at a rotational frequency of 1200 rpm or more.

In the machining unit, as the relationship between the first machining device and the second machining device satisfies the above relationship, machining can be performed while reducing thermal influence exerted on a workpiece.

Figure 14:
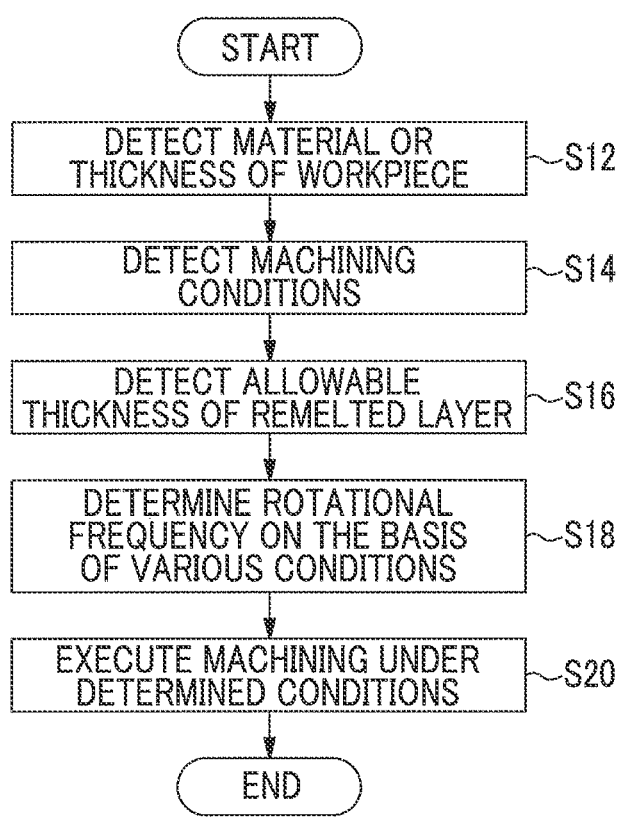
FIG. 14 is a flowchart showing an example of the control operation of the machining device.

Next, an example of the control operation of the machining device will be described with reference to FIG. 14. FIG. 14 is a flowchart showing an example of the control operation of the machining device. The processing shown in FIG. 14 is an example of the processing of determining a rotational frequency. The control device 22 detects information on the material and a thickness of a workpiece, as Step S12. Here, the control device 22 acquires information required in addition to the material and thickness of the workpiece. The control device 22 detects machining conditions as Step S14 if the parameters of the workpiece are detected in Step S12. Here, the machining conditions are values regarding the diameter of a target hole, cutting length, and various kinds of performance of an available laser beam. The control device 22 detects the allowable thickness of a remelted layer as Step S16 if the machining conditions are detected in Step S14. The allowable thickness of the remelted layer can be detected by reading a preset value or by being calculated through computation from the values of Step S12 or Step S14.

Here, the remelted layer (recast layer) is a layer in which a solid is fluidified and solidified by laser irradiation during machining of a workpiece. Since the remelted layer is a region that is once melted and solidified, the remelted layer is a layer whose boundaries can be clearly identified from the other portions. Additionally, the remelted layer is formed on an inner peripheral surface of a hole formed by radiating a laser beam or on a cut surface of a cut workpiece. For this reason, the thickness of the remelted layer is a length in a direction orthogonal to the irradiation direction of a laser beam.

If the control device 22 detects the allowable thickness of the remelted layer in Step S16, the rotational frequency is determined on the basis of various conditions as Step S18, machining is executed on the determined conditions as Step S20, and the present processing is ended. Here, the control device 22 calculates a rotational frequency at which the thickness of the remelted layer does not exceed the allowable thickness on the basis of the various conditions. Specifically, the control device calculates an allowable rotational frequency range (that is, an allowable rotational frequency at which the thickness of the remelted layer does riot exceed the allowable thickness) of a laser beam, on the basis of the relationship between the thickness of the remelted layer of a workpiece and the rotational frequency of the laser beam, determines a rotational frequency included in the allowable rotational frequency range as the rotational frequency of the rotation mechanism, and rotates the rotation mechanism at the determined rotational frequency.

As the control device 22 determines the rotational frequency as described above, a workpiece can be machined while the thickness of the remelted layer is made to be the allowable thickness or less. Additionally, in the control device 22, in order to make the thickness of the remelted layer a thickness smaller than the allowable thickness of the remelted layer, there are conditions in which the rotating speed of a laser beam is raised, or there are methods of shortening the pulse of a laser beam.

Additionally, it is also preferable that the control device calculate an allowable rotational frequency range of a laser beam on the basis of the relationship between the allowable thickness of an oxidization layer of a workpiece and the rotational frequency of a laser beam, determine a rotational frequency included in the allowable rotational frequency range as the rotational frequency of the rotation mechanism, and rotate the rotation mechanism at the determined rotational frequency. The oxidization layer is a layer oxidized by laser irradiation during machining of a workpiece. Since the oxidization layer is a region where an original material is oxidized, the oxidization layer is a layer whose boundary can be clearly identified from the other portions. Additionally, the oxidization layer is formed on an inner peripheral surface of a hole formed by radiating a laser beam or on a cut surface of a cut workpiece. For this reason, the thickness of the oxidization layer is a length in a direction orthogonal to the irradiation direction of a laser beam.

Additionally, it is also preferable that the control device calculate an allowable rotational frequency range on the basis of the relationship between the amount of scattered matter of the workpiece and the rotational frequency of the laser beam, determine a rotational frequency included in the allowable rotational frequency range as the rotational frequency of the rotation mechanism, and rotate the rotation mechanism at the determined rotational frequency.

Example of Experiment

Figure 15:
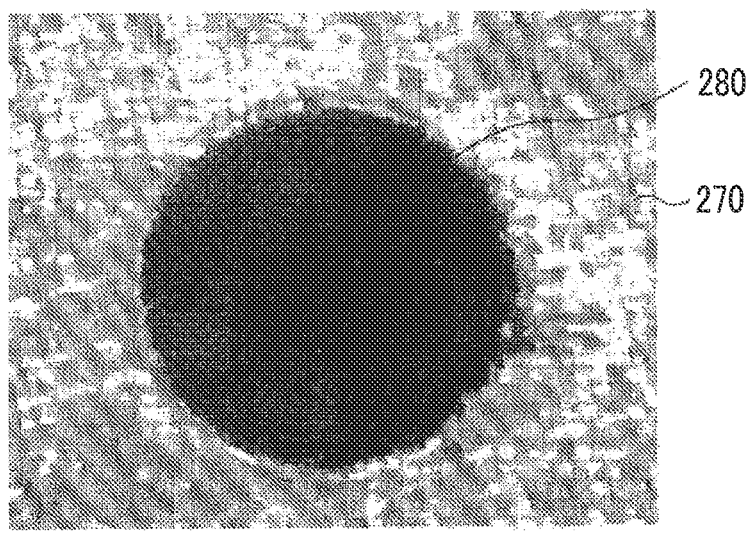
FIG. 15 is an explanatory view for illustrating a workpiece machined with the machining device.
Figure 16:
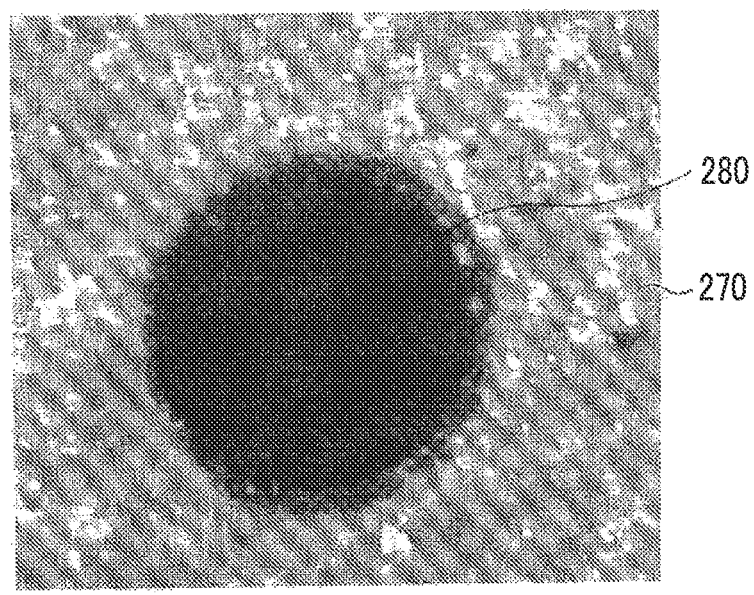
FIG. 16 is an explanatory view showing the workpiece from a side opposite to that of FIG. 15.

FIG. 15 is an explanatory view for illustrating a workpiece machined with the machining device. FIG. 16 is an explanatory view showing the workpiece from a side opposite to that of FIG. 15. The workpiece was machined using the machining device 10 of the above embodiment. In the machining device 10, a laser beam to be radiated had a laser peak power of 6000 W, a frequency of 1000 Hz, and a pulse width 0.1 ms. Additionally, in the machining device 10, the rotating speed of the laser beam was 590 rpm. Additionally, the irradiation time of the laser beam was 0.2 seconds, and the focal distance thereof was 0.5 mm. Additionally, in the present example of the experiment, oxygen was used as assist gas, and the pressure of the assist gas was 0.8 MPa. Additionally, the workpiece was Inconel (registered trademark) with a thickness of 0.8 mm.

The results obtained by performing machining with the above conditions are shown in FIGS. 15 and 16. Here, FIG. 15 shows a front surface of the workpiece, and FIG. 16 shows a rear surface of the workpiece. As shown in FIGS. 15 and 16, in the present example of the experiment, a workpiece 270 is formed with a hole 280. By performing machining with the above conditions as shown in FIGS. 15 and 16, it turns out that, even if the irradiation time of the laser beam is 0.2 seconds, an end surface of the hole 280 has little distortion or irregularity, and machining can be performed with high precision.

Reference Signs List

8: WORKPIECE
10: MACHINING DEVICE
12: LASER OUTPUT DEVICE
14: GUIDING OPTICAL SYSTEM
16, 102, 150, 244, 246: IRRADIATING HEAD
18: MOVING MECHANISM
20: SUPPORTING BASE
22: CONTROL DEVICE
30: ARM
32: DRIVING SOURCE
40: HOUSING
42: OPTICAL SYSTEM UNIT
44: COLLIMATING OPTICAL SYSTEM
46: DEFLECTING OPTICAL SYSTEM
48: CONDENSING OPTICAL SYSTEM
50: OPTICAL SYSTEM SUPPORTING UNIT
52: FIRST PRISM
54: SECOND PRISM
60, 104, 154: ROTATION MECHANISM
64: ENCODER
65: COOLING MECHANISM
66: DETECTING PART
68: ROTATING PART
70, 110: FIXED PART
72, 112, 156: ROTATING PART
74, 114: BEARING
80, 119: MOTOR
82: BELT
84, 86: ARROW
88: PUMP
89: CONNECTING PIPE
90: CENTER
92: IMAGINARY CIRCLE
94, 96, 98: IRRADIATION POSITION
120: STATOR
122: ROTOR
158: FLUID BEARING (HYDROSTATIC BEARING)
159: PUMPS
200: MACHINING UNIT
202: FIRST MACHINING DEVICE
204: SECOND MACHINING DEVICE
212: FIBER LASER OUTPUT DEVICE
214: SHORT PULSE LASER OUTPUT DEVICE
216: LASER GUIDING OPTICAL SYSTEM
218, 230, 232: OPTICAL FIBER
220: IRRADIATION MECHANISM
222: MOVING MECHANISM
234: AXICON LENS UNIT
236, 242: REFLECTING MEMBER
238, 240: HALF MIRROR
250, 252: IRRADIATION POSITION
254, 256: MACHINED REGION
260: FIRST CORE LAYER
262, 266: CLADDING LAYER
264: SECOND CORE LAYER
L, L1, L2, L2A: LASER BEAM

The invention claimed is:

1. A machining device that irradiates a workpiece with a laser beam to perform cutting or boring machining of the workpiece, the machining device comprising:

a laser output device that outputs a laser beam;
a guiding optical system that guides the laser beam output from the laser output device; and
an irradiating head that guides the laser beam output from the guiding optical system, and irradiates the workpiece with the laser beam,
the irradiating head including,
  a first prism that refracts the laser beam,
  a second prism that is arranged at a position facing the first prism to refract the laser beam,
  a rotation mechanism that integrally rotates the first prism and the second prism, the rotation mechanism having a fixed part, a rotating part rotatably supported inside the fixed part and supporting the first prism and the second prism, and a motor that rotates the rotating part, the motor including, a rotor attached to the rotating part, and a stator provided outside the rotor and attached to the fixed part;
  a position adjusting mechanism changing a relative angle and a relative distance of the first prism and the second prism manually or automatically by a driving force during cutting or boring machining of the workpiece;
  an encoder having, a detecting part fixed to an inner peripheral surface of the fixed part, and a rotational part fixed to an outer peripheral surface of the rotating part and rotates together with the rotating part, such that an inner peripheral surface of the detecting part that extends along a rotational axis of the rotation mechanism opposes an outer peripheral surface of the rotational part that extends along the rotational axis, the rotational part being provided with an identifier such that the detecting part detects rotation of the rotational part to detect rotating speed of the rotating part with respect to the fixed part; and
  a controller configured to control the rotation mechanism to rotate the first prism and the second prism utilizing the detected rotating speed of the rotating part, such that a light path of the laser beam is rotated around the rotational axis of the rotation mechanism and the workpiece is irradiated while rotating the position of irradiation to the workpiece.

2. The machining device according to claim 1, wherein the laser output device further outputs the laser beam in a pulse, and
wherein the controller sets the cycle of ON/OFF of the laser beam to a nonintegral multiple of the cycle of rotation of the irradiation position.

3. The machining device according to claim 1, wherein the workpiece is made of any material of stainless steel, ceramic, steel, carbon steel, ceramics, silicon, titanium, tungsten, resin, plastics, fiber-reinforced plastic, iron alloys, and an aluminum alloy.

4. The machining device according to claim 1, wherein the laser output device is a fiber laser output device.

5. The machining device according to claim 1, wherein the laser output device is a short pulse laser output device that outputs a laser beam in a pulse with a pulse width of 100 picoseconds or less.

6. The machining device according to claim 1, wherein the irradiating head has a parallel optical system that collimates the laser beam output from the guiding optical system to cause the laser beam to enter the first prism, and a condensing optical system that condenses the laser beam output from the second prism.

7. The machining device according to claim 1, wherein the rotating part has a hollow shape defining a light passage in the rotating part.

8. The machining device according to claim 7, wherein the portion of the holding mechanism corresponding to the light path of the laser beam is a hollow spindle.

9. The machining device according to claim 7, wherein the irradiating head has
a supporting part supporting the holding mechanism, and
a bearing causing the holding mechanism to be supported by the supporting part in a rotatable state.

10. The machining device according to claim 9, wherein the bearing includes a hydrostatic bearing.

11. The machining device according to claim 9, wherein the bearing includes a rolling bearing.

12. The machining device according to claim 1, wherein the rotational frequency of the rotation mechanism is 120 rpm or more.

13. The machining device according to claim 1, wherein the irradiating head further includes a cooling mechanism that cools the first prism and the second prism.

14. The machining device according to claim 1, wherein the position adjusting mechanism changes the relative angle of the first prism and the second prism.

15. The machining device according to claim 1, wherein the position adjusting mechanism changes the relative distance of the first prism and the second prism.

16. The machining device according to claim 1, wherein, the controller determines a rotational frequency within an allowable frequency range, and when an oscillation frequency of the laser beam is less than 1 kHz, a determined rotational frequency is 120 rpm or more, and when the oscillation frequency is 1 kHz or higher, the determined frequency is 1200 rpm or more.

17. The machining device according to claim 1, wherein the rotation mechanism includes a plurality of a bearing provided between the fixed part and the rotating part for rotatably supporting the rotating part with respect to the fixed part, and the motor includes the rotor attached to an outer periphery of the rotating part, and the stator attached to an inner periphery of the fixed part and coaxially provided outside the rotor, and
in each of the plurality of bearings, an outer diameter of the bearing is substantially the same as an inner diameter of the inner periphery of the fixed part, and an inner diameter of the bearing is substantially the same as an outer diameter of the outer periphery of the rotating part.

* * * * *